(12) United States Patent
Gunji

(10) Patent No.: US 12,092,944 B2
(45) Date of Patent: Sep. 17, 2024

(54) MOUNT MODULE WITH WATERPROOFNESS AND IMAGE PICKUP APPARATUS EQUIPPED WITH MOUNT MODULE

(71) Applicant: CANON KABUSHIKI KAISHA, Tokyo (JP)

(72) Inventor: Manami Gunji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 538 days.

(21) Appl. No.: 17/496,944

(22) Filed: Oct. 8, 2021

(65) Prior Publication Data
US 2022/0121089 A1    Apr. 21, 2022

(30) Foreign Application Priority Data

Oct. 16, 2020   (JP) .................................. 2020-174794

(51) Int. Cl.
  *G03B 17/14*   (2021.01)
  *G02B 7/02*    (2021.01)

(52) U.S. Cl.
  CPC ............ *G03B 17/14* (2013.01); *G02B 7/022* (2013.01)

(58) Field of Classification Search
  CPC .............................. G02B 7/022; G03B 17/14
  USPC ........................................................ 359/827
  See application file for complete search history.

(56) References Cited

U.S. PATENT DOCUMENTS

| 4,168,897 A | 9/1979 | Gates |
| 4,963,902 A | 10/1990 | Fukahori |
| 5,384,614 A | 1/1995 | Hasuda |
| 2012/0195587 A1 | 8/2012 | Hasuda et al. |
| 2014/0111686 A1 | 4/2014 | Iikawa |

(Continued)

FOREIGN PATENT DOCUMENTS

| JP | H06294994 A | 10/1994 |
| JP | H07168263 A | 7/1995 |
| JP | H10186486 A | 7/1998 |

(Continued)

OTHER PUBLICATIONS

Jan. 5, 2024 Chinese Office Action, which is enclosed with an English Translation, that issued in Chinese Patent Application No. 202111201466.4.

(Continued)

*Primary Examiner* — Joseph P Martinez
*Assistant Examiner* — Grant A Gagnon
(74) *Attorney, Agent, or Firm* — Cowan, Liebowitz & Latman, P.C.

(57) ABSTRACT

A mount module that is capable of improving waterproofness without enlarging its size. The mount module to which a lens barrel having claws is attachable includes a base member, a fixed mount member, a movable member, movable claws, first and second sealing member. A fixed mount member has a first mount surface that abuts to a second mount surface of the lens barrel. The movable member is arranged between the fixed mount member and the base member rotatably around an optical axis. The movable claws engage with the claws of the lens barrel and move in an optical axis direction by interlocking with rotation of the movable member. The first sealing member is arranged between the movable member and the fixed mount member. And the second sealing member is arranged between the movable member and the base member.

8 Claims, 21 Drawing Sheets

(56) References Cited

U.S. PATENT DOCUMENTS

2015/0212395 A1  7/2015  Kuroda et al.
2020/0209719 A1  7/2020  Tamura et al.

FOREIGN PATENT DOCUMENTS

JP  2019-035974 A  3/2019
JP  2020060637 A   4/2020

OTHER PUBLICATIONS

European Search Report issued on Mar. 14, 2022, which is enclosed, that issued in the corresponding European Patent Application No. 21198448.9.

MOUNT MODULE WITH WATERPROOFNESS AND IMAGE PICKUP APPARATUS EQUIPPED WITH MOUNT MODULE

BACKGROUND OF THE INVENTION

Field of the Invention

The present invention relates to a mount module with waterproofness and an image pickup apparatus equipped with the mount module.

Description of the Related Art

An image pickup apparatus that enables an interchange of a lens barrel is used widely. A mount member of a bayonet connection system is known as one of mechanisms of a mount module that enables an interchange of a lens barrel. In the mount member of the bayonet connection system, a mount surface of a mount member of a lens barrel is come in contact with a mount surface of a mount member of an image pickup apparatus of which a distance from an image sensor provided in the image pickup apparatus has been adjusted, and then, the lens barrel is rotated in a predetermined direction around an optical axis. Then, claws provided in both of the mount module and lens barrel are engaged and the lens barrel is energized to the image sensor side with an energizing member like a flat spring. Thereby, the lens barrel is held by the image pickup apparatus.

However, the conventional mount member of the bayonet connection system has a problem in that the lens barrel may cause shakiness in a range of a deflection amount of the energizing member because the lens barrel is held with only the energization force of the energizing member. Particularly, when a large-sized lens barrel is attached, the shakiness at the mount module easily occurs, which lowers the waterproofness due to a gap caused by the shakiness.

In order to solve this problem, Japanese Laid-Open Patent Publication (Kokai) No. 2019-035974 (JP 2019-035974A) suggests a configuration that arranges a holding member having a groove on an outer periphery of a mount member to which a lens barrel is fixed, that arranges an O-ring in the groove, and that secures the waterproofness with a cover that covers the O-ring.

However, the technique described in the above-mentioned publication has a problem in that the entire mount module is enlarged because the holding member is needed to arrange the O-ring on the outer periphery of the mount module.

SUMMARY OF THE INVENTION

The present invention provides a mount module that is capable of improving waterproofness without enlarging its size.

Accordingly, a first aspect of the present invention provides a mount module to which a lens barrel having claws is attachable, the mount module including a base member, a fixed mount member having a first mount surface that abuts to a second mount surface of the lens barrel, a movable member that is arranged between the fixed mount member and the base member rotatably around an optical axis, movable claws that engage with the claws of the lens barrel and move in an optical axis direction by interlocking with rotation of the movable member, a first sealing member that is arranged between the movable member and the fixed mount member, and a second sealing member that is arranged between the movable member and the base member.

According to the present invention, the mount module that is capable of improving waterproofness is achieved without enlarging its size.

Further features of the present invention will become apparent from the following description of exemplary embodiments with reference to the attached drawings.

DESCRIPTION OF THE EMBODIMENTS

Figure 1A:
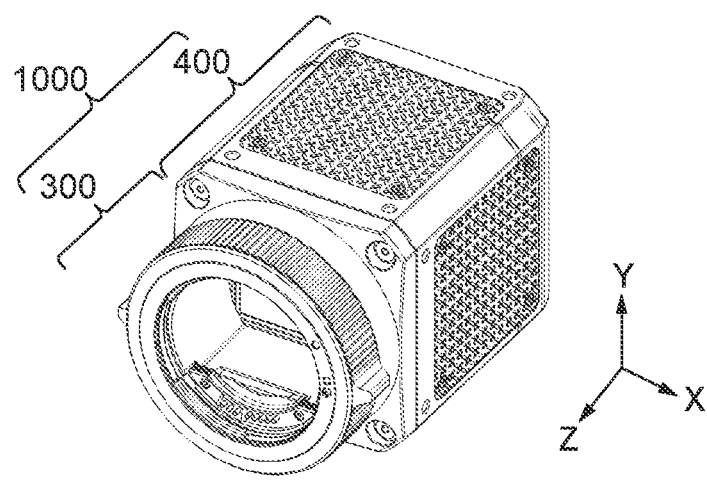
FIG. 1A, FIG. 1B, and FIG. 1C are perspective views showing an image pickup apparatus and an image pickup system according to a first embodiment.

Hereafter, embodiments according to the present invention will be described in detail by referring to the drawings.

In the following description, a front-side perspective view means a view showing a target viewed from its slanting front side, and a back-side perspective view means a view showing a target viewed from its slanting back side. It should be noted that the same expression is used for an exploded perspective view.

Figure 1B:
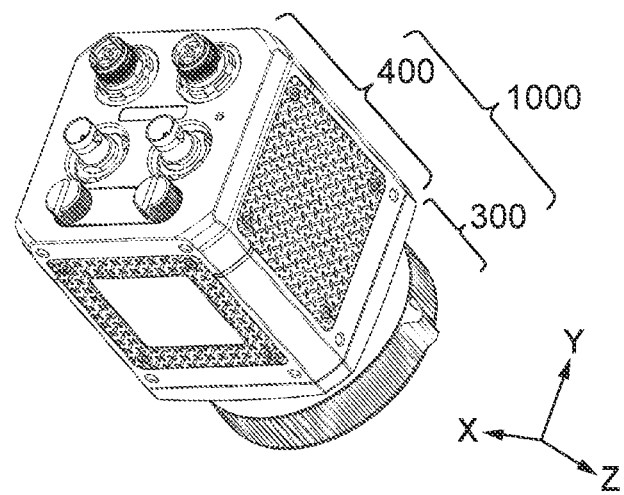
Figure 1C:
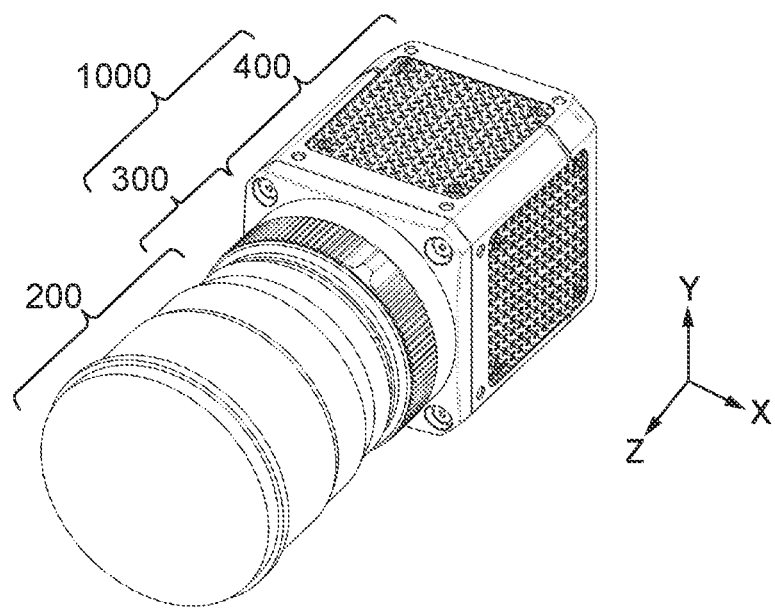

FIG. 1A and FIG. 1B are a front-side perspective view and a back-side perspective view showing an image pickup apparatus 1000 according to the first embodiment. FIG. 1C is a front-side perspective view showing the image pickup system in which a lens barrel 200 (what is called an interchangeable lens) is attached to the image pickup apparatus 1000.

An orthogonal coordinate system is defined as shown in FIG. 1A, FIG. 1B, and FIG. 1C for convenience of description. A Z-direction is parallel to an image-pickup optical axis (hereinafter referred to as an "optical axis") of the image pickup apparatus 1000. The optical axis in the mount module according to this embodiment is approximately coincident with a center axis of the mount, and specifically, it is approximately coincident with a center axis of a diameter (an inside diameter, an outside diameter, or an average diameter of them) of a body-side mount surface 321 mentioned later. An X-direction is a width direction of the image pickup apparatus 1000 that intersects perpendicularly with the Z-direction. A Y-direction is a height direction of the image pickup apparatus 1000 that intersects perpendicularly with both the Z-direction and X-direction. In the Z-direction, the direction directed to an object as an image-pickup target is a positive direction (+Z-direction) and the counter direction is a negative direction (−Z-direction). In the X-direction, the rightward direction when the image pickup apparatus 1000 is viewed from the +Z side is a positive direction (+X-direction) and the counter direction (leftward direction) is a negative direction (−X-direction). In the Y-direction, the upward direction when the X-direction and Z-direction are parallel to a horizontal plane is a positive direction (+Y-direction) and the counter direction (downward direction) is a negative direction (+Y-direction). It should be noted that the front side, back side, right side, left side, upper side, and lower side of the image pickup apparatus 1000 are respectively defined as the +Z side, −Z side, +X side, −X side, +Y side, and −Y side.

The image pickup apparatus 1000 generally consists of a first mount module 300 and a main body module 400 (image pickup apparatus body). The first mount module 300 is modularized so as to be attachable to and detachable from the main body module 400. The lens barrel 200 is attachable to and detachable from the first mount module 300. The main body module 400 contains a main substrate equipped with a control circuit that controls the entire image pickup apparatus 1000, an image sensor that converts incident light guided through the lens barrel 200 into an electrical signal, etc. Moreover, various kinds of terminals (interfaces) for power supply, video output, etc. are arranged on a back surface of the main body module 400. Since various kinds of components arranged in the inside and the back surface of the main body module 400 do not have a direct relationship to the present invention, more detailed descriptions are omitted.

Figure 2A:
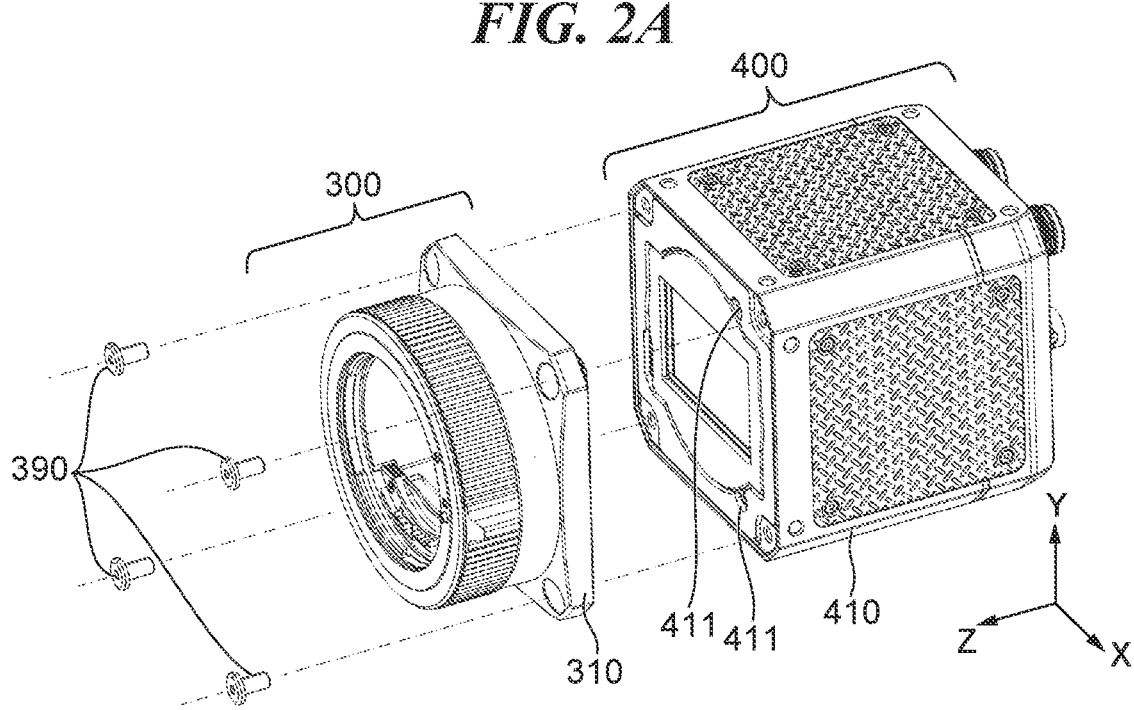
FIG. 2A and FIG. 2B are exploded perspective views showing the image pickup apparatus.
Figure 2B:
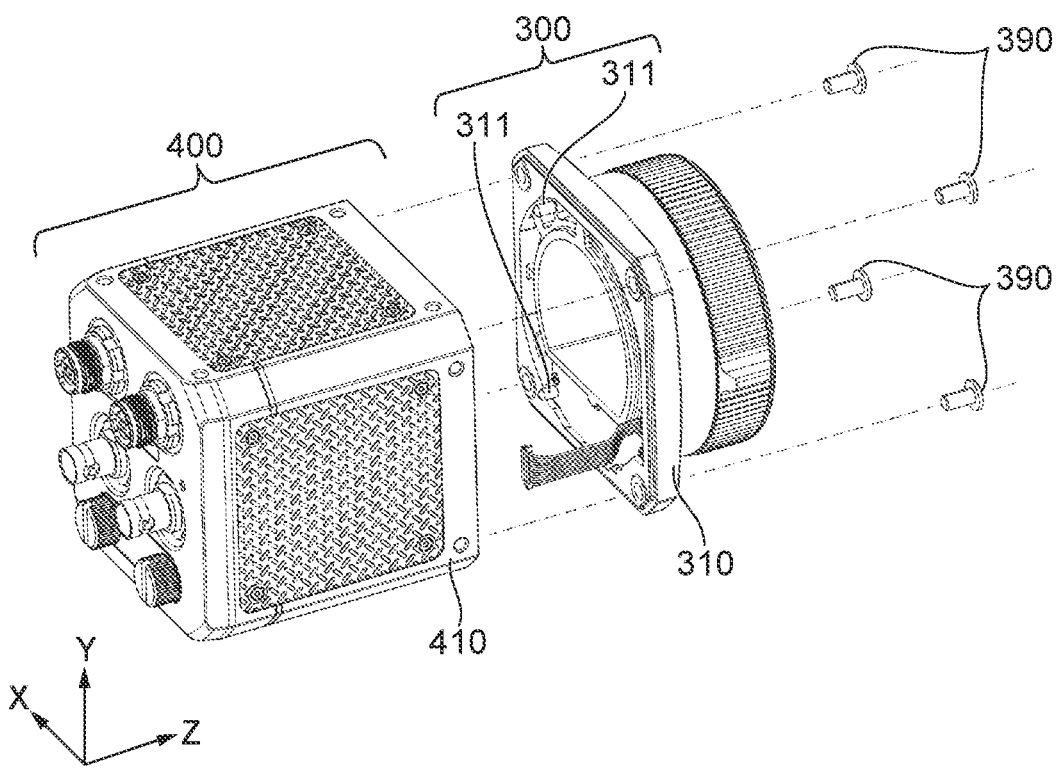

FIG. 2A and FIG. 2B are a front-side exploded perspective view and a back-side exploded perspective view showing the image pickup apparatus 1000 in a state where the first mount module 300 is separated from the main body module 400.

The main body module 400 is provided with a front cover 410 that constitutes a part of the external appearance of the image pickup apparatus 1000. The front cover 410 is provided with positioning holes 411 for positioning the first mount module 300 to the main body module 400. In the meantime, the first mount module 300 has a mount base 310 (base member) that constitutes a part of external appearance of the image pickup apparatus 1000. The mount base 310 is provided with positioning bosses 311 that will be inserted into the positioning holes 411. A connection position of the first mount module 300 to the main body module 400 is fixed by engaging the positioning bosses 311 of the mount base 310 with the positioning holes 411 of the front cover 410. The first mount module 300 is connected and fixed to the main body module 400 with fixing screws 390 in the state where the first mount module 300 is positioned to the main body module 400.

Figure 3:
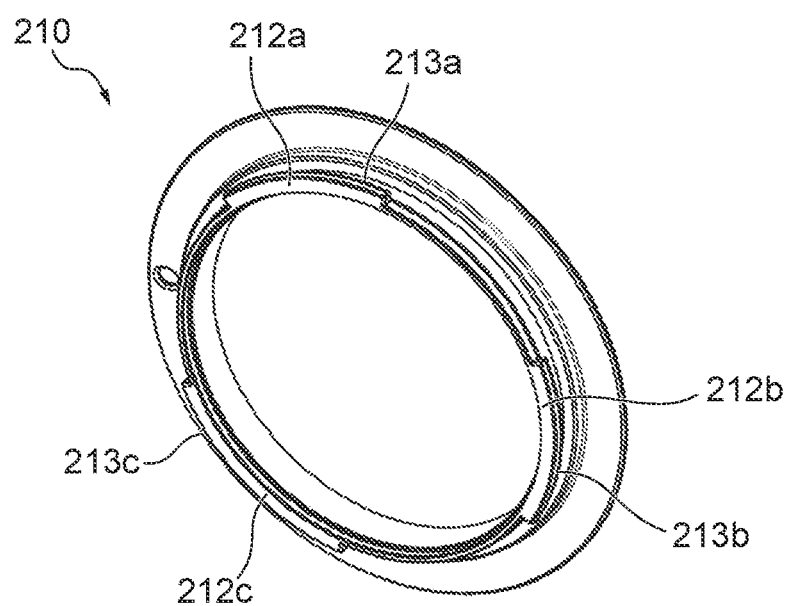
FIG. 3 is a perspective view showing a mount member of a lens barrel that is attachable to and detachable from a first mount module that constitutes the image pickup apparatus.

FIG. 3 is a back-side perspective view showing a mount member 210 of the lens barrel 200. The basic structure of the first mount module 300 is proportionate to the mount structure of the conventional bayonet connection system. Accordingly, the mount member 210 of the lens barrel 200 that is attachable to and detachable from the first mount module 300 has a structure that is attachable to and detachable from the mount of the conventional bayonet connection system. Specifically, the mount member 210 has a lens-side mount surface 211 (see FIG. 5B) and bayonet claws 212a, 212b, and 212c. The bayonet claws 212a, 212b, and 212c respectively have bayonet-claw contact surfaces 213a, 213b, and 213c.

Figure 4A:
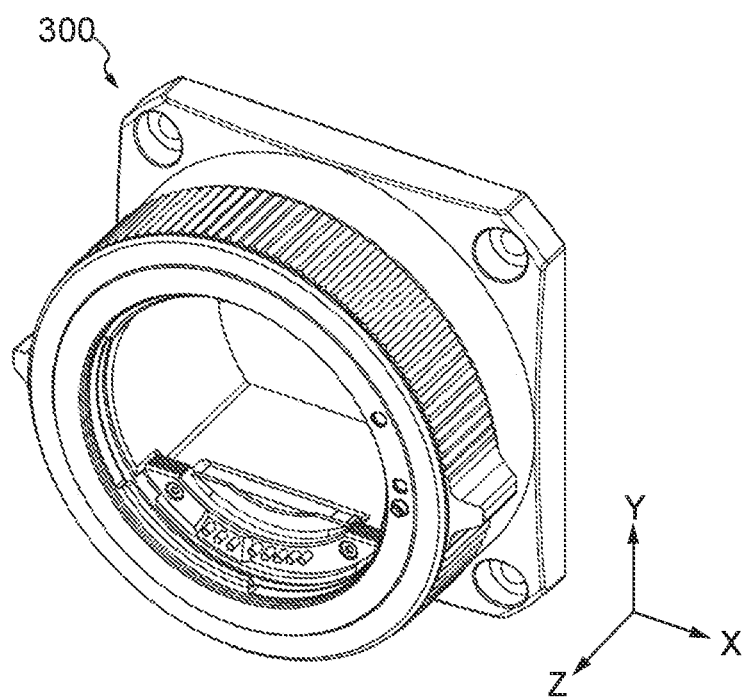
FIG. 4A and FIG. 4B are perspective views showing the first mount module.
Figure 4B:
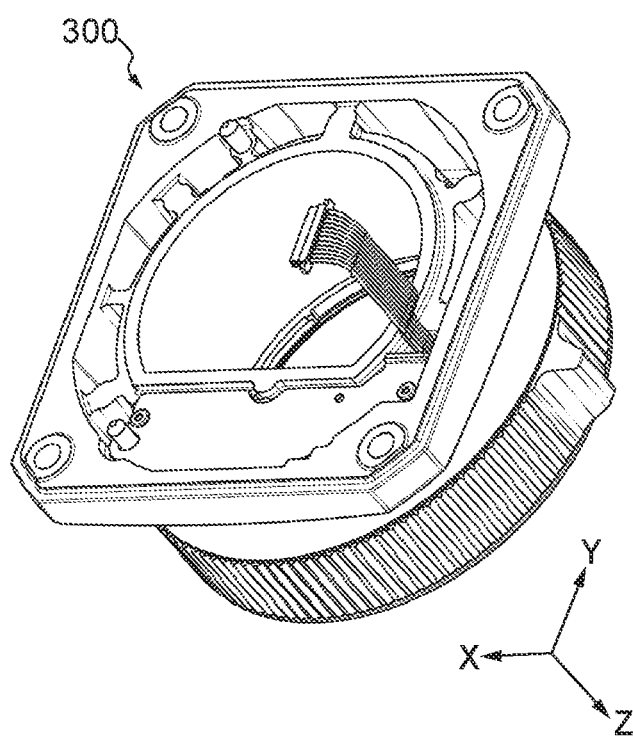
Figure 5A:
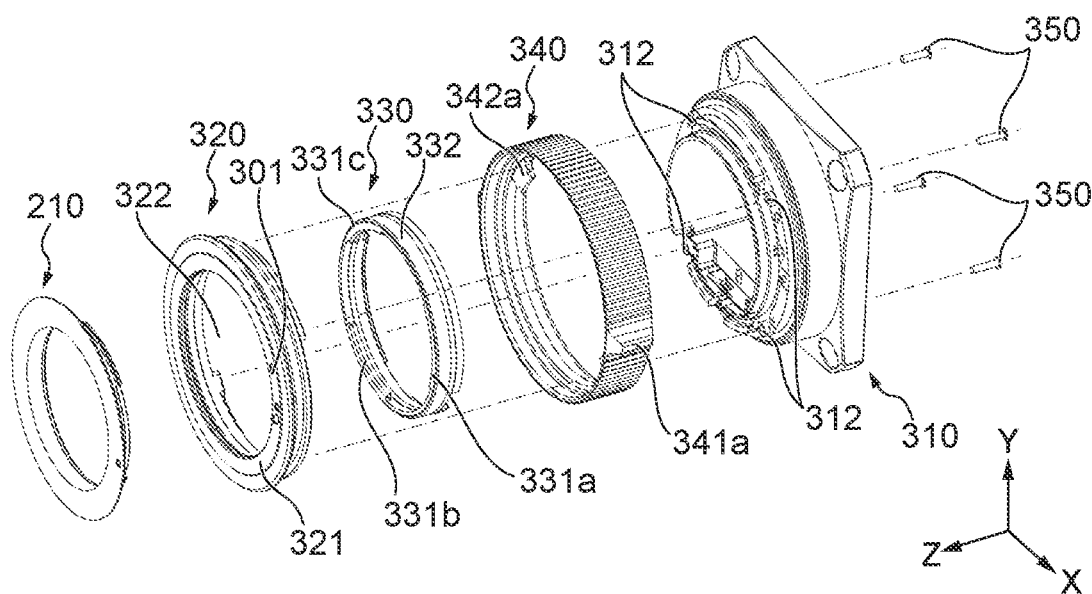
FIG. 5A and FIG. 5B are exploded perspective views describing a principal part of the first mount module.
Figure 5B:
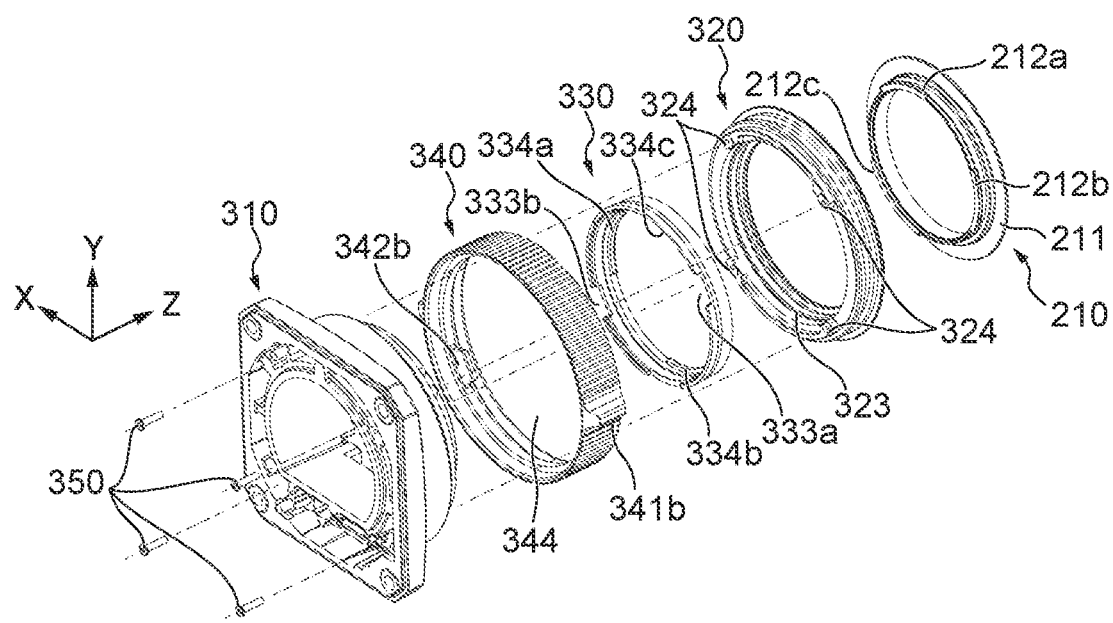
Figure 6A:
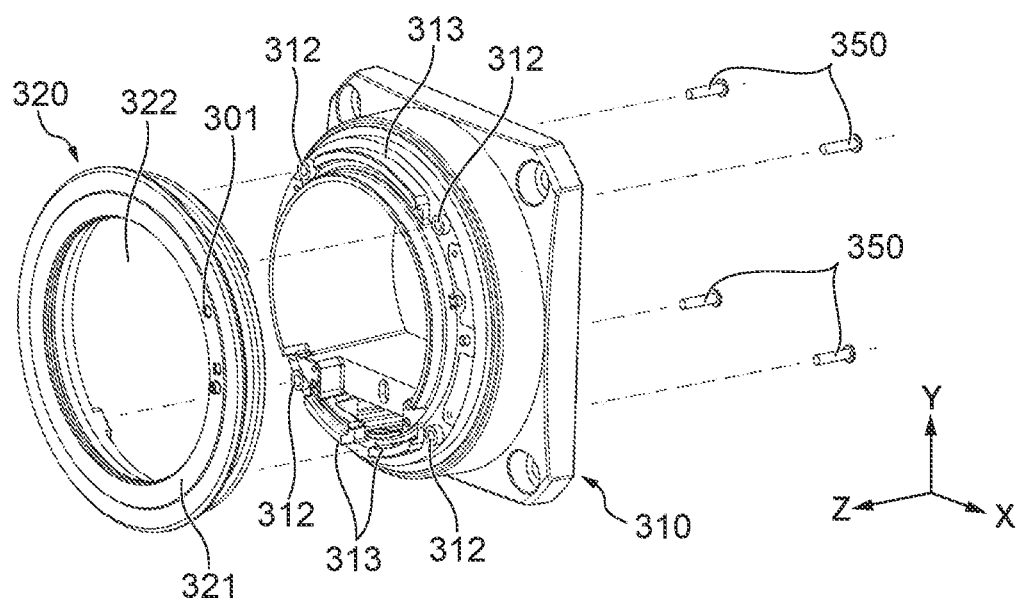
FIG. 6A and FIG. 6B are perspective views describing a configuration for fixing a fixed mount member to a mount base in the first mount module.
Figure 6B:
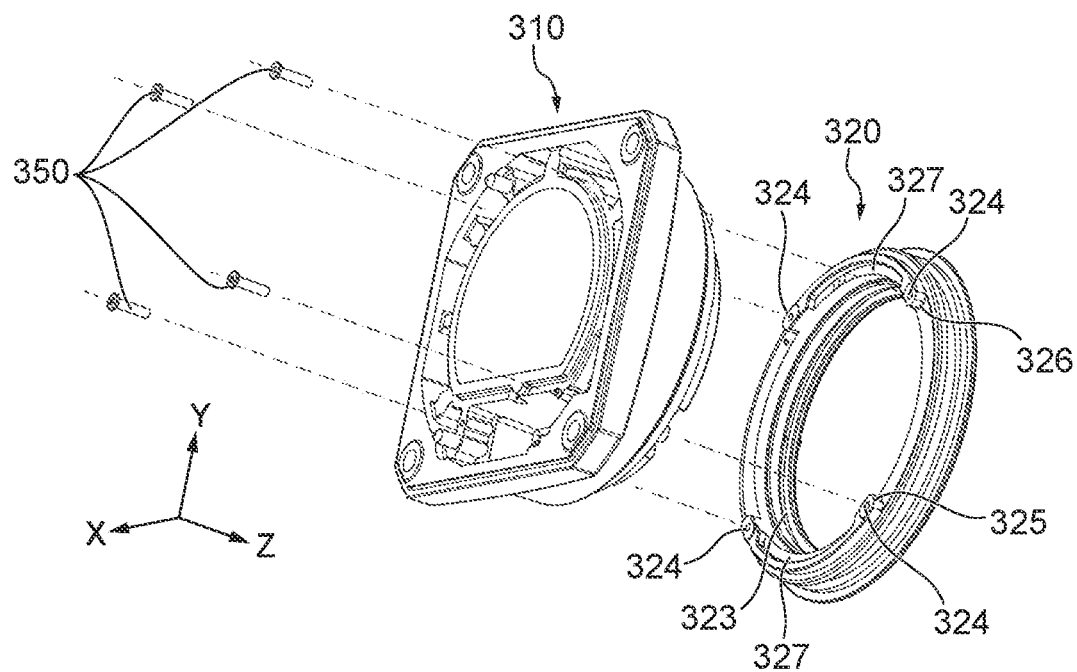

FIG. 4A and FIG. 4B are a front-side perspective view and a back-side perspective view showing the first mount module 300. FIG. 5A and FIG. 5B are a front-side exploded perspective view and a back-side exploded perspective view showing the first mount module 300. It should be noted that FIG. 5A and FIG. 5B show the principal parts of the first mount module 300 in an exploded state and also show the mount member 210 of the lens barrel 200. The first mount module 300 is provided with the mount base 310, a fixed mount member 320, a movable mount member 330, and an operation ring 340 (a movable member) as the principal parts. FIG. 6A and FIG. 6B are perspective views describing the configuration for fixing (fastening) the fixed mount member 320 to the mount base 310. FIG. 6A and FIG. 6B shows the mount base 310 and the fixed mount member 320 viewed from different directions, respectively.

The mount base 310 has through holes 312 and positioning ribs 313. The fixed mount member 320 has the body-side mount surface 321, an opening 322, a first thread 323, internal threads 324, a first contact surface 325, a second contact surface 326, and positioning grooves 327.

The body-side mount surface 321 abuts on the lens-side mount surface 211 of the lens barrel 200 when the lens barrel 200 is attached to the first mount module 300. When the lens barrel 200 is attached to or detached from the first mount module 300, the bayonet claws 212a are inserted into or separated from the opening 322. The first thread 323 is an internal thread formed around the optical axis.

The fixed mount member 320 is positioned with respect to the mount base 310 when the positioning ribs 313 of the mount base 310 engage with the positioning grooves 327 of the fixed mount member 320. The shapes of the positioning ribs 313 are designed so as not to disturb sliding motions of the movable mount member 330 and operation ring 340, and details thereof will be mentioned later.

The movable mount member 330 to which the operation ring 340 is incorporated is arranged between the mount base 310 and the fixed mount member 320 (details will be mentioned later), and the fixed mount member 320 is positioned with respect to the mount base 310 as mentioned above. Then, fixing screws 350 are inserted through the four through holes 312 of the mount base 310 from the back side (−Z side) and are fastened to the internal threads 324 of the fixed mount member 320. That is, the fixing screws 350 fasten the fixed mount member 320 and the mount base 310 from an opposite side of the attachment side of the lens barrel 200. Thereby, the fixed mount member 320 is fixed to the mount base 310 in the state where the movable mount member 330 and operation ring 340 are rotatably held between the mount base 310 and the fixed mount member 320.

Figure 7A:
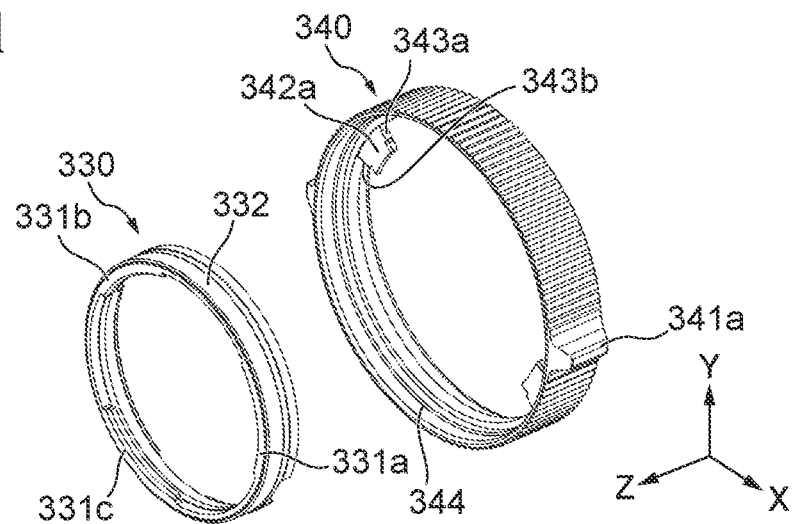
FIG. 7A and FIG. 7B are perspective views showing a positional relationship when an operation ring is engaged with a movable mount member in the first mount module.
Figure 7B:
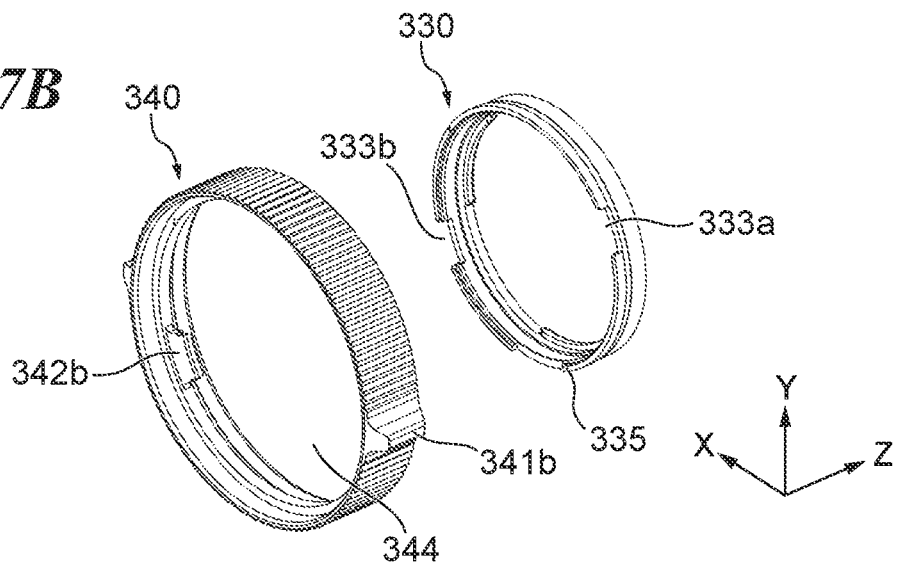
Figure 7C:
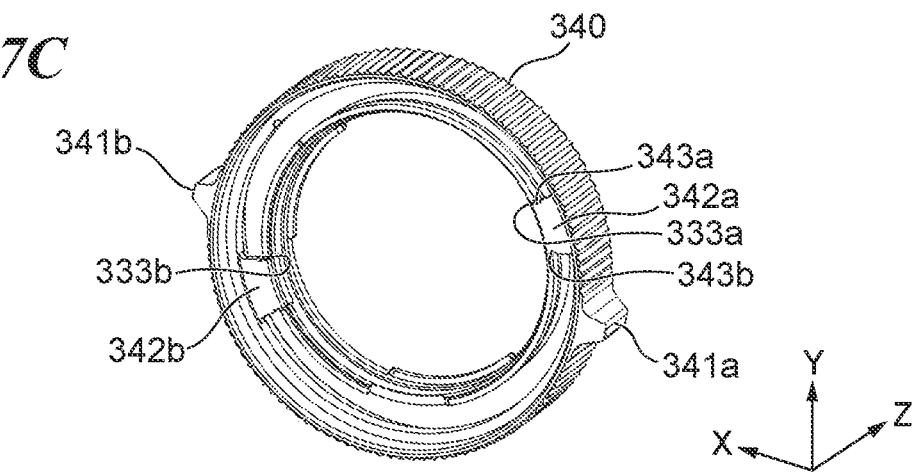
FIG. 7C is a perspective view showing an engaged state.

FIG. 7A and FIG. 7B are perspective views showing a positional relationship in the state where the operation ring 340 is engaged with the movable mount member 340 in the first mount module. FIG. 7A and FIG. 7B shows the movable mount member 330 and the operation ring 340 viewed from different directions, respectively. FIG. 7C is a backside perspective view showing the state where the operation ring 340 is engaged with the movable mount member 330.

The movable mount member 330 has claws 331a, 331b, and 331c, a second thread 332, and grooves 333a and 333b. The claws 331a, 331b, and 331c respectively have claw contact surfaces 334a, 334b, and 334c (see FIG. 5B) that respectively abut on the bayonet-claw contact surfaces 213a, 213b, and 213c of the bayonet claws 212a, 212b, and 212c of the mount member 210 of the lens barrel 200. The second thread 332 is an external thread that screws to the first threaded 323 of the fixed mount member 320.

The operation ring 340 has knobs 341a and 341b, convex parts 342a and 342b, and operation-ring contact surfaces 343a and 343b. A position of the operation ring 340 is determined when the convex parts 342a and 342b of the operation ring 340 respectively engage with the grooves 333a and 333b of the movable mount member 330 in the area interposed between the mount base 310 and the fixed mount member 320. Thereby, the movable mount member 330 rotates by interlocking with the rotation of the operation ring 340. It should be noted that the operation ring 340 is not fastened (connected) to the movable mount member 330 with screws etc.

Figure 8A:
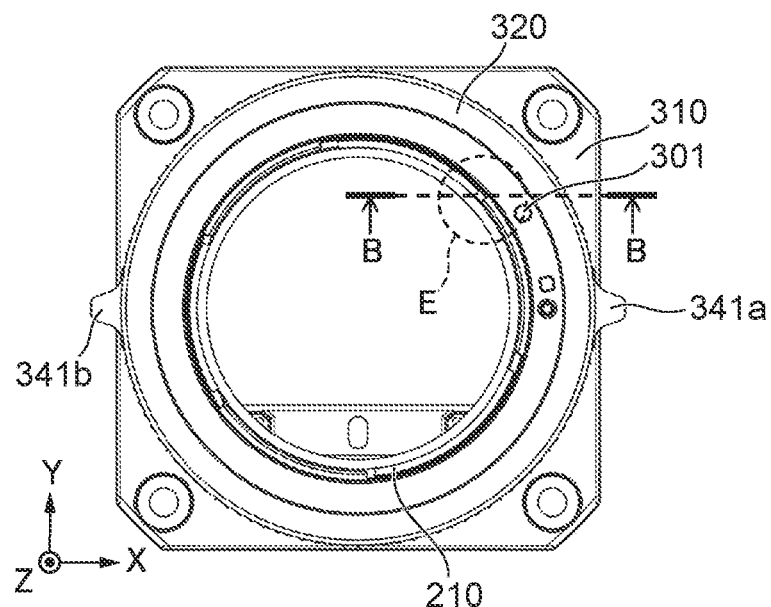
FIG. 8A, FIG. 8B, and FIG. 8C are front views showing positional relationships between claws of the lens barrel and claws of the movable mount member.
Figure 8B:
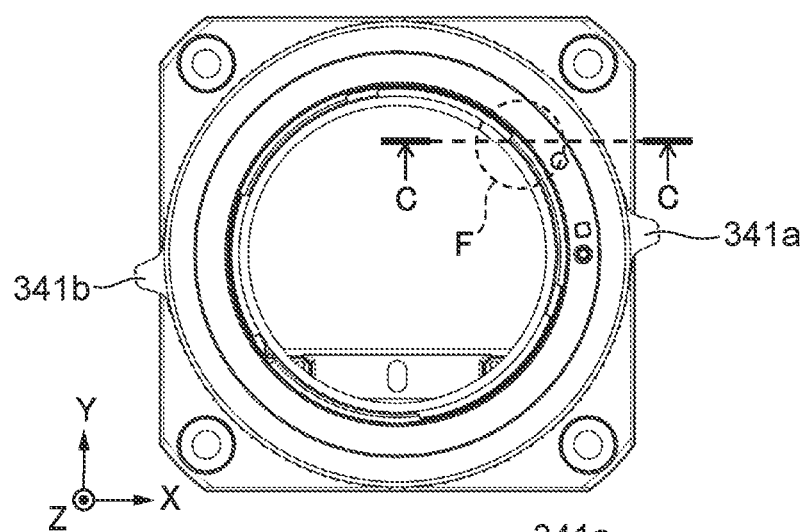
Figure 8C:
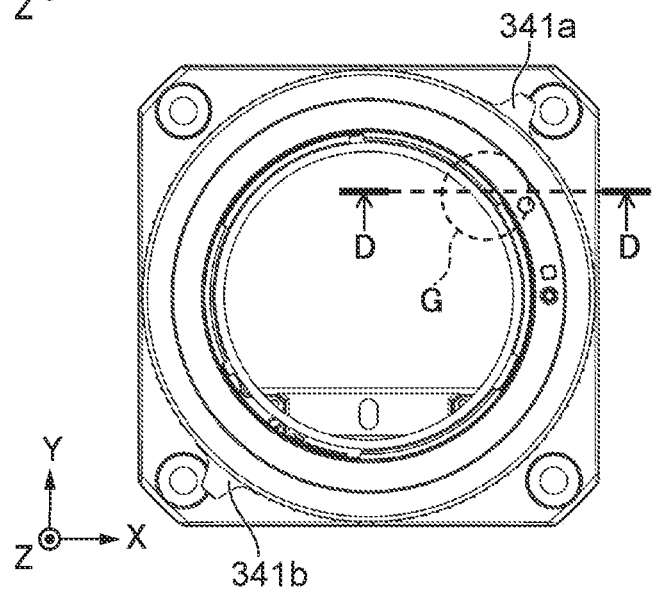
Figure 9A:
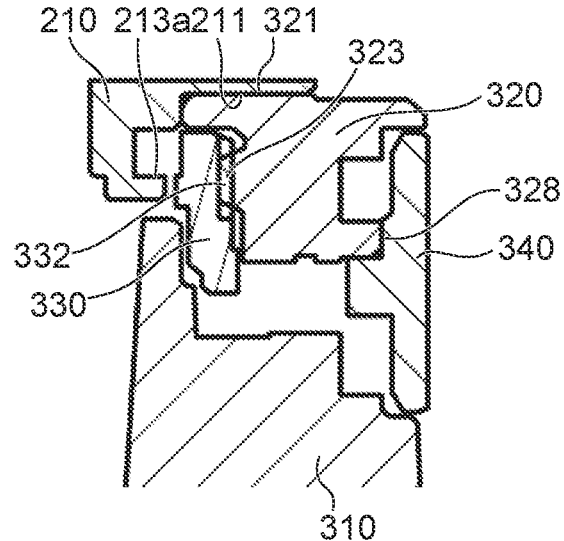
FIG. 9A, FIG. 9B, and FIG. 9C are sectional views respectively taken along a line D-D in FIG. 8A, a line E-E in FIG. 8B, and a line F-F in FIG. 8C.
Figure 9B:
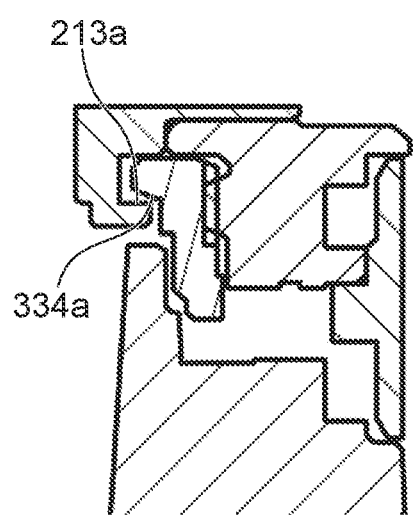
Figure 9C:
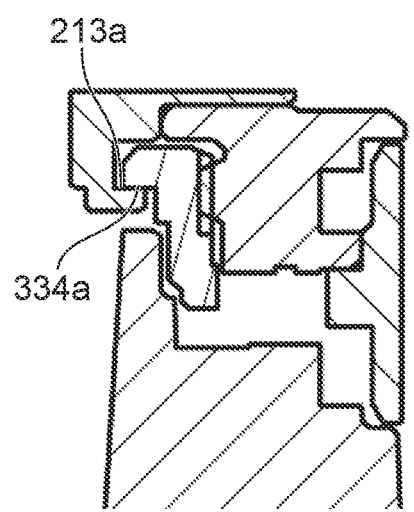
Figure 10A:
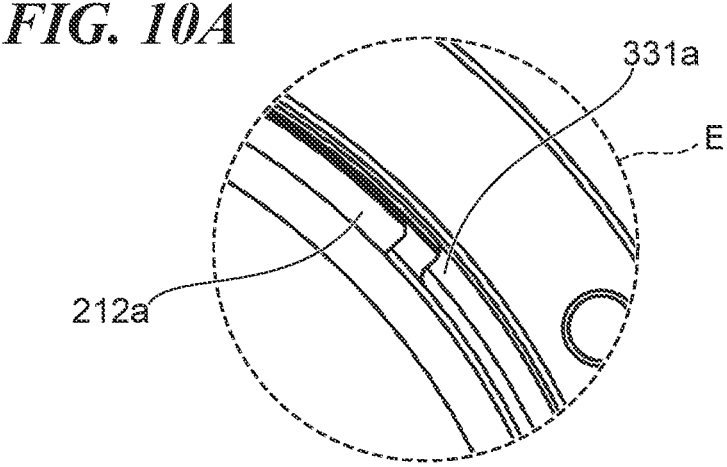
FIG. 10A, FIG. 10B, and FIG. 10C are enlarged views respectively showing a section G in FIG. 8A, a section H in FIG. 8B, and a section J in FIG. 8C.
Figure 10B:
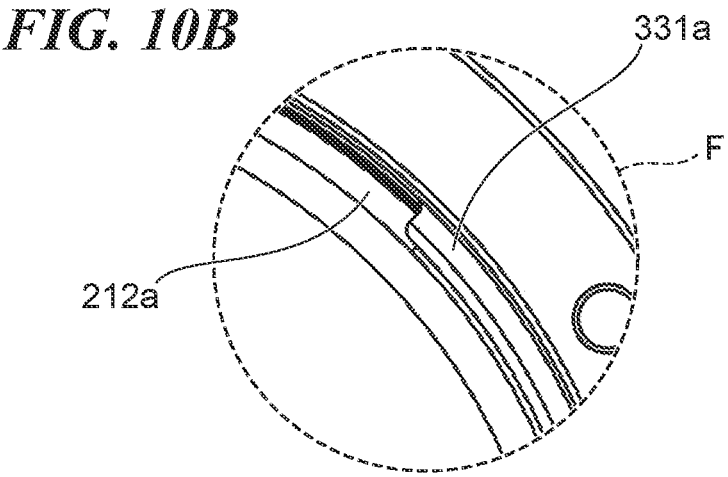
Figure 10C:
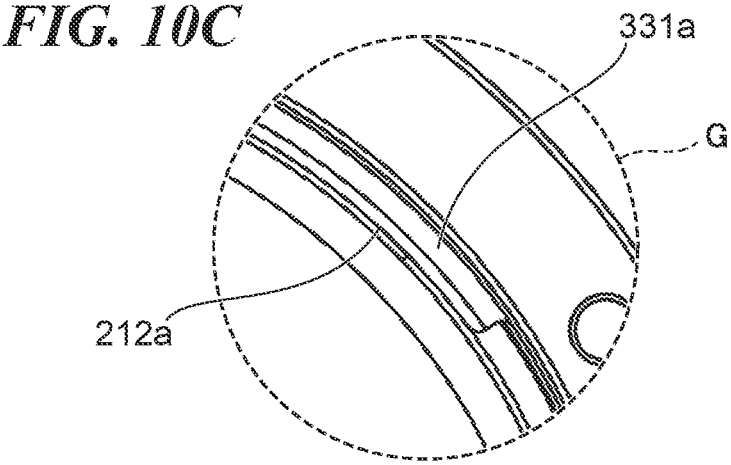

FIG. 8A, FIG. 8B, and FIG. 8C are front views showing positional relationships between the bayonet claws 212a, 212b, and 212c of the lens barrel 200 and the claws 331a, 331b, and 331c of the movable mount member 330. FIG. 9A is a sectional view taken along a line B-B shown in FIG. 8A, FIG. 9B is a sectional view taken along a line C-C shown in FIG. 8B, and FIG. 9C is a sectional view taken along a line D-D shown in FIG. 8C. FIG. 10A is an enlarged view showing a section E shown in FIG. 8A, FIG. 10B is an enlarged view showing a section F shown in FIG. 8B, and FIG. 10C is an enlarged view showing a section G shown in FIG. 8C.

FIG. 8A shows a state where the bayonet claws 212a, 212b, and 212c do not overlap with the claws 331a, 331b, and 331c when they are projected to an optical-axis projection plane and where the lens barrel 200 is attachable to and detachable from the image pickup apparatus 1000. That is, FIG. 8A shows a state where the mount member 210 of the lens barrel 200 is dropped into the first mount module 300 of the image pickup apparatus 1000. In this state, the bayonet claws 212a through 212c of the lens barrel 200 are inserted into the opening 322 of the fixed mount member 320, and the lens-side mount surface 211 of the mount member 210 is abutting to the body-side mount surface 321 of the fixed mount member 320. It should be noted that "on an optical-axis projection plane" means "on a projection plane viewed in the optical axis direction (on the XY plane viewed from the +Z side to the −Z side).

FIG. 8B shows a state where the movable mount member 330 is rotated counterclockwise around the optical axis when viewed from the front side of the image pickup apparatus 1000 to a position where the claws 331a through 331c begin to overlap with the bayonet claws 212a through 212c on the optical-axis projection plane. In the first mount module 300, the operation ring 340 is rotatably arranged to the fixed mount member 320 because the opening 344 (see FIG. 7B) of the operation ring 340 is slidably engaged with a pipe part 328 (see FIG. 9A) of the fixed mount member 320 in a dimension relationship of loose fit.

As mentioned above, the convex parts 342a and 342b of the operation ring 340 are respectively engaged with the grooves 333a and 333b of the movable mount member 330. Thereby, when the operation ring 340 is rotated, the movable mount member 330 rotates in the same direction. In order to improve a slide property, slide grease may be applied to the slide engagement part between the opening 344 of the operation ring 340 and the pipe part 328 of the fixed mount member 320.

In a transition process from the state in FIG. 8A to the state in FIG. 8B, the claws 331a through 331c of the movable mount member 330 are moving toward the mount base 310 along the optical axis direction. That is, the movable mount member 330 rotates in the same direction as the rotational direction of the operation ring 340 and is engaged with the operation ring 340 movably in the optical axis direction. It should be noted that the claws 331a through 331c do not engage with the bayonet claws 212a through 212c in the state in FIG. 8B.

FIG. 8C shows a state where the operation to rotate the movable mount member 330 counterclockwise around the optical axis when viewed from the front side of the image pickup apparatus 1000 is completed and where the lens barrel 200 is strongly attached to the image pickup apparatus 1000. In this state, the bayonet claws 212a through 212c of the lens barrel 200 wholly overlap with the claws 331a through 331c of the movable mount member 330 on the optical-axis projection plane, and the claw contact surfaces 334a through 334c respectively abut to the bayonet-claw contact surfaces 213a through 213c.

The knobs 341a and 341b provided in the operation ring 340 are shaped so as not to protrude from the image pickup apparatus 1000 on the optical-axis projection plane in the state where the lens barrel 200 is attached. This reduces unintentional external force acting to the knobs 341a and 341b in the state where the lens barrel 200 is attached.

A procedure of attaching the lens barrel 200 to the image pickup apparatus 1000 is as follows. First, a user aligns an index (not shown) provided in the lens barrel 200 with an index 301 (see FIG. 8A) provided in the fixed mount member 320 and makes the lens-side mount surface 211 of the first lens barrel 200 abut to the body-side mount surface 321 of the fixed mount member 320. Thereby, the state in FIG. 8A is achieved. Next, the user grips the two knobs 341a and 341b and rotates the operation ring 340 counterclockwise when viewed from the +Z side so that the bayonet claws 212a through 212c will overlap with the claws 331a through 331c on the optical-axis projection plane as shown in FIG. 8B.

After that, the user grips the two knobs 341a and 341b and further rotates the operation ring 340 counterclockwise when viewed from the +Z side so that the claw contact surfaces 334a through 334c will abut to the bayonet-claw contact surfaces 213a through 213c. Thereby, the lens barrel 200 is fixed to the first mount module 300 as shown in FIG. 8C. When detaching the lens barrel 200 from the image pickup apparatus 1000, the user may conversely perform the above-mentioned attachment operation of the lens barrel 200 and its description is omitted.

It should be noted that the operation ring 340 is rotatable between a first position shown in FIG. 8A and a second position shown in FIG. 8C. In the first position, the operation-ring contact surface 343a of the operation ring 340 abuts to the second contact surface 326 of the fixed mount member 320. In the second position, the operation-ring contact surface 343b of the operation ring 340 abuts to the first contact surface 325 of the fixed mount member 320. The rotation range of the movable mount member 330 becomes the same as the rotation range of the operation ring 340. The positioning ribs 313 of the mount base 310 are shaped so as not to obstruct the movements of the convex parts 342a and 342b when the movable mount member 330 and the operation ring 340 rotate.

Figure 11A:
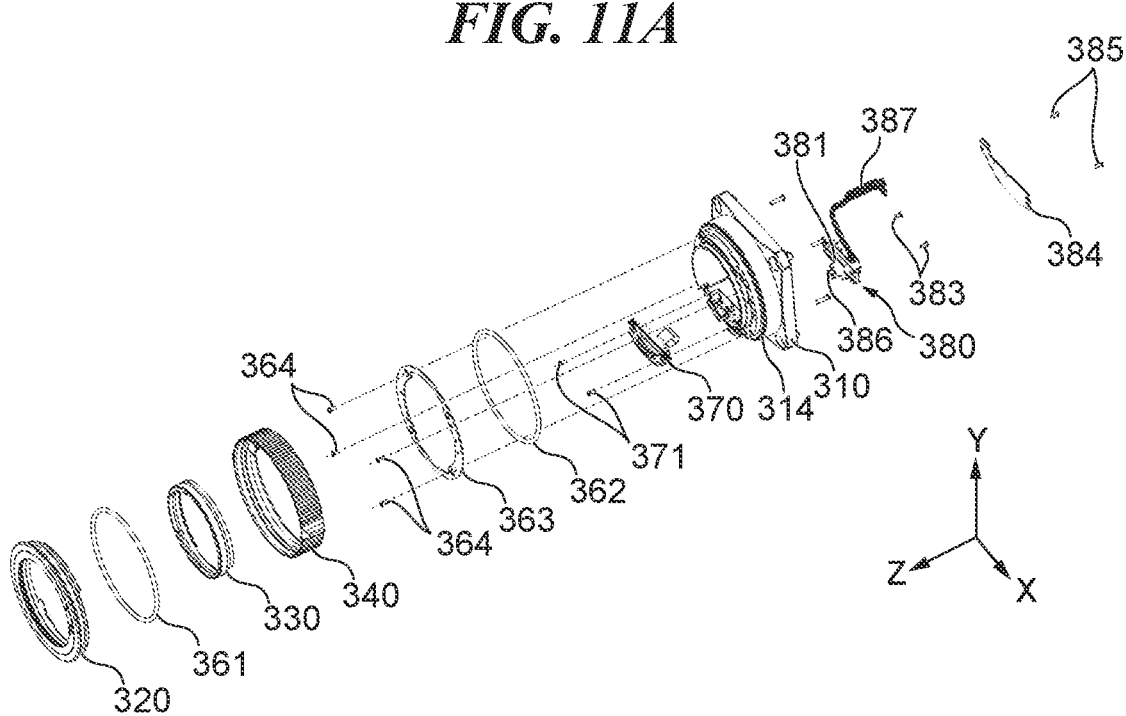
FIG. 11A and FIG. 11B are exploded perspective views showing the first mount module.
Figure 11B:
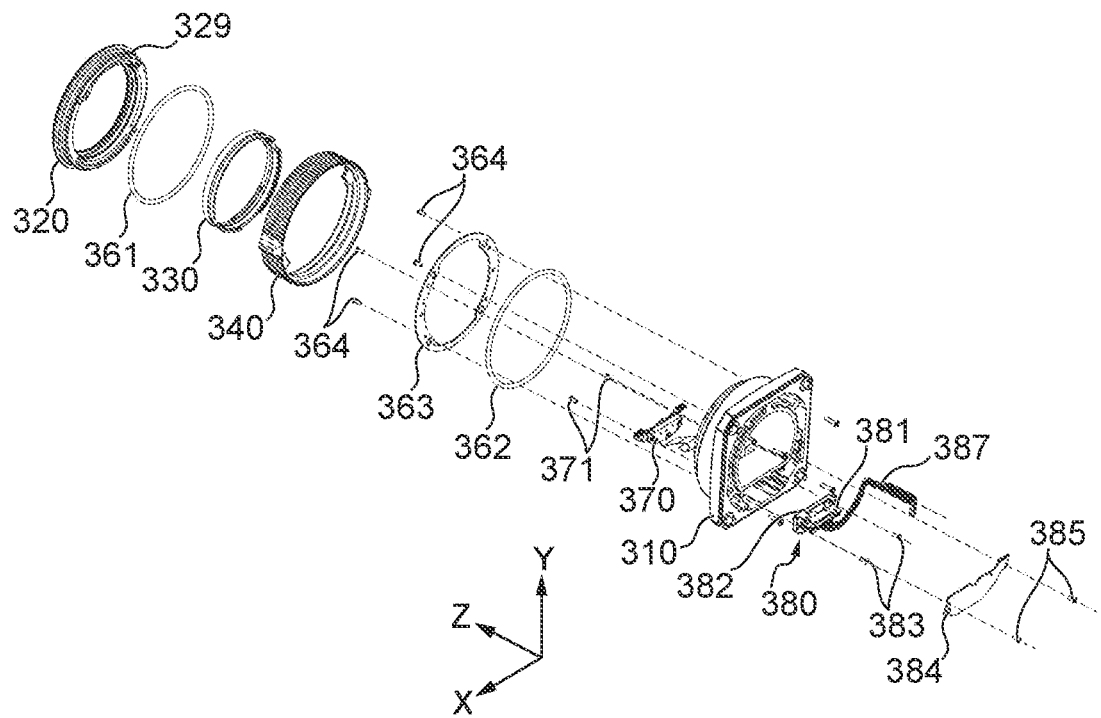

Next, a waterproof structure of the first mount module 300 will be described. FIG. 11A and FIG. 11B are a front-side exploded perspective view and a back-side exploded perspective view showing the first mount module 300. The first mount module 300 is provided with the mount base 310, the fixed mount member 320, the movable mount member 330, the operation ring 340, and the fixing screws 350 as mentioned above. The first mount module 300 is further provided with a first O-ring 361, a second O-ring 362, a metal plate member 363, fixing screws 364, an electrical communication contact unit 370, a rotation detection unit 380, a cover 384, and fixing screws 385.

Figure 12A:
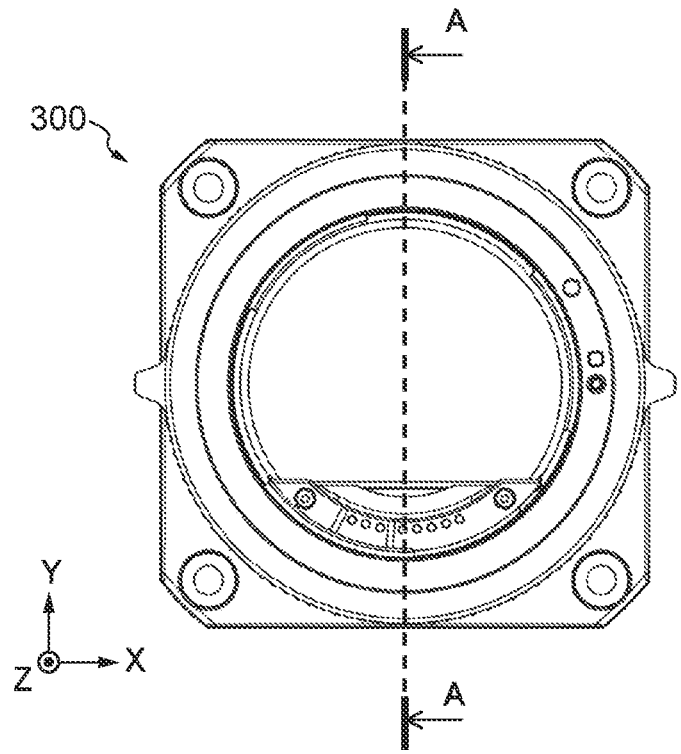
FIG. 12A is a front view showing the first mount module and FIG. 12B is a sectional view taken along a line C-C in FIG. 12A.
Figure 12B:
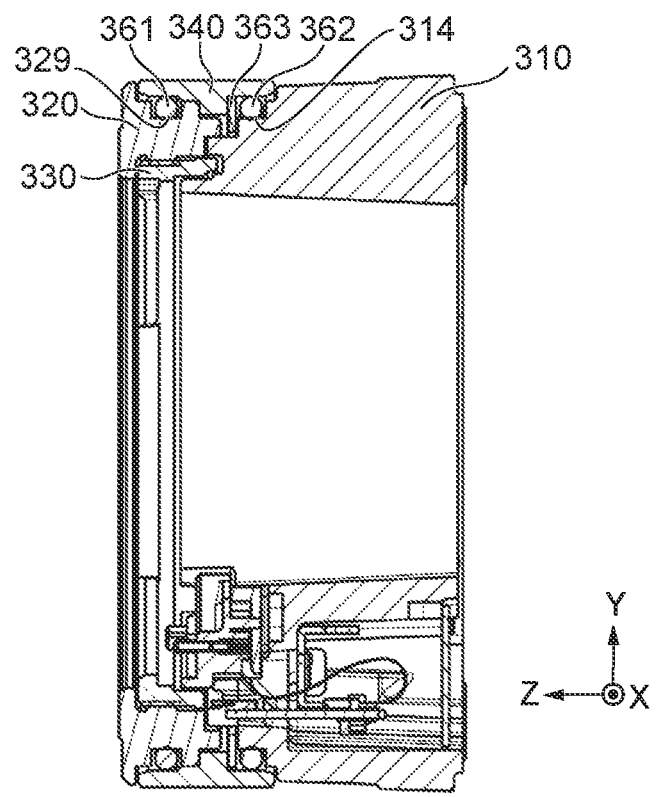

FIG. 12A is a front view showing the first mount module 300, and FIG. 12B is a sectional view taken along a line A-A shown in FIG. 12A. The fixed mount member 320 has a groove 329. The approximately annular first O-ring 361 as a first elastic member is arranged in the groove 329. That is, the first O-ring 361 is arranged in an annular space formed between the fixed mount member 320 and the operation ring 340.

Moreover, the mount base 310 has an annular step 314. The approximately annular second O-ring 362 as a second elastic member is arranged on the step 314. The metal plate member 363 is fastened to the mount base 310 with the fixing screws 364 so as to regulate movement of the second O-ring 362 in the optical axis direction. That is, the second O-ring 362 is arranged in the space formed by the metal plate member 363, mount base 310, and operation ring 340. Although the metal plate member 363 and the mount base 310 are configures as separate members in this embodiment, they may be configured as a single member.

Since the space formed between the fixed mount member 320 and the operation ring 340 in the first mount module 300 is filled up with the first O-ring 361 in this way, a gap does not arise between the fixed mount member 320 and the operation ring 340. Moreover, since the space formed between the mount base 310 and the operation ring 340 is filled up with the second O-ring 362, a gap does not arise between the mount base 310 and the operation ring 340. Accordingly, infiltration of water and dust into the inside through the boundary between the fixed mount member 320 and the operation ring 340 and the boundary between the mount base 310 and the operation rings 340 is prevented.

Although the O-rings are respectively arranged in the space between the fixed mount member 320 and the operation ring 340 and the space between the mount base 310 and the operation ring 340 in this embodiment, another configuration may be employed. For example, O-rings may be respectively arranged in the space between the fixed mount member 320 and the movable mount member 330 and the space between the mount base 310 and the movable mount member 330.

When the lens barrel 200 is attached to the image pickup apparatus 1000, the electrical communication contact unit 370 contacts an electrical communication contact unit (not shown) of the lens barrel 200 and electrical conduction is achieved. The rotation detection unit 380 is provided with a rotation detection substrate 381, a support metal plate 382, fixing screws 383, and a communication cable 387. The rotation detection substrate 381 is fixed to the support metal plate 382, and the support metal plate 382 is fastened to the mount base 310 with the fixing screws 383. The rotation detection substrate 381 is provided with a rotation detection switch 386.

As described by referring to FIG. 8A through FIG. 10C, when the lens barrel 200 is fixed to the first mount module 300 by operating the operation ring 340, the rotation detection switch 386 is pressed by a cutout annular convex part 335 (see FIG. 7B) provided in the movable mount member 330. Thereby, the attachment of the lens barrel 200 to the image pickup apparatus 1000 is detected and ON/OFF of the electrical communication contact unit 370 is switched. The communication cable 387 is connected to a control substrate (not shown) arranged inside the main body module 400. And thereby, the communication and power supply between the image pickup apparatus 1000 and the lens barrel 200 are available. The cover 384 is fastened to the mount base 310 with the fixing screws 385 and regulates routing of the communication cable 387.

As mentioned above, since the first mount module 300 prevents infiltration of water and dust into the inside from the outside, occurrences of poor communication and failure due to infiltration of water and dust into the electrical communication contact unit 370 from the first mount module 300 are prevented.

Figure 13A:
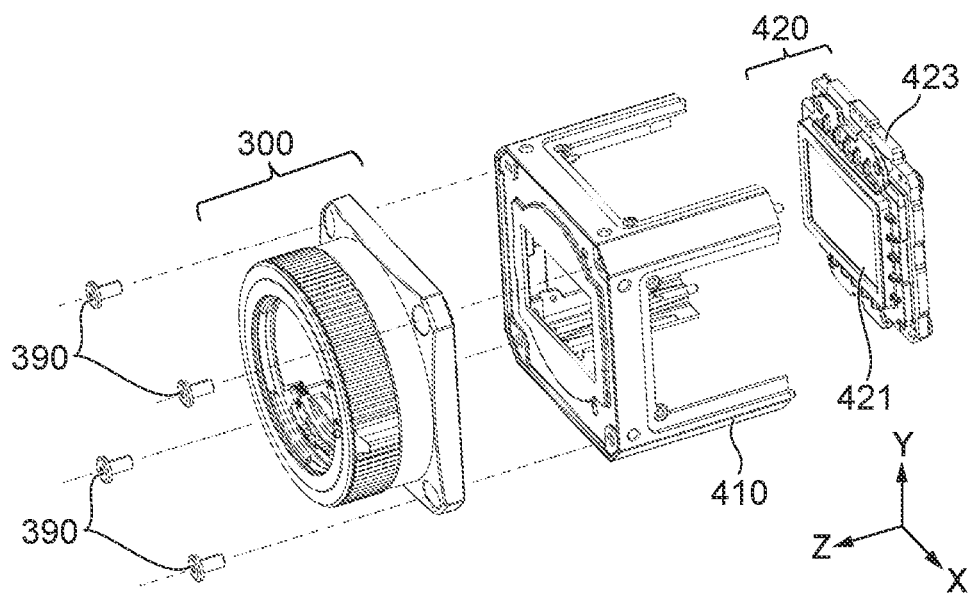
FIG. 13A and FIG. 13B are exploded perspective views showing the first mount module and a main body module.
Figure 13B:
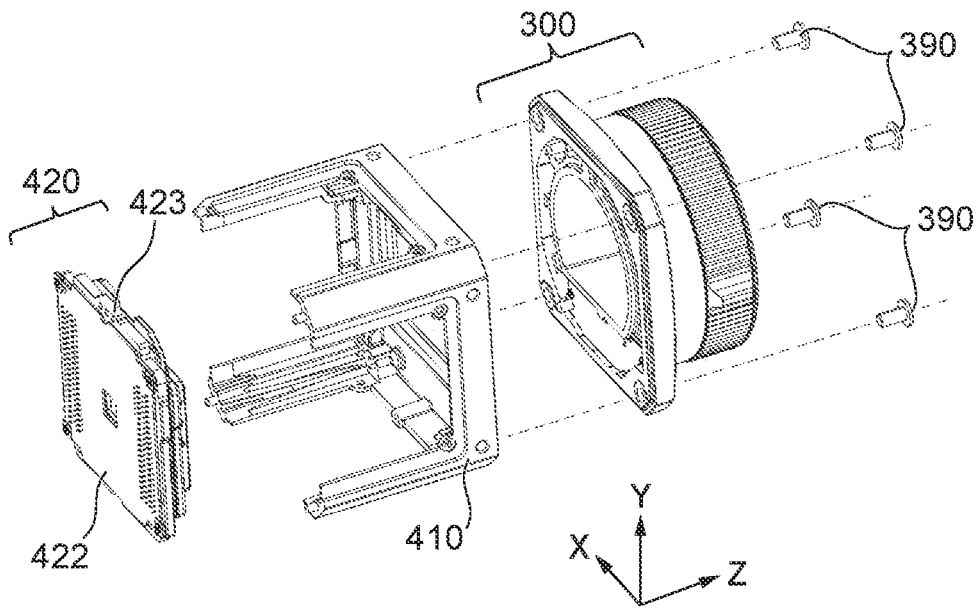

FIG. 13A and FIG. 13B are exploded perspective views showing the first mount module 300 and the main body module 400. An image pickup module 420 is built in the main body module 400. The image pickup module 420 is provided with a substrate 422, an image sensor 421 implemented in the substrate 422, and a holding member 423 holding the substrate 422. Incident light passing through the lens barrel 200 forms an image on the surface of the image sensor 421. The image sensor 421 converts the formed optical image into a video signal (an electrical signal). The image pickup module 420 is fixed to the front cover 410 with screws (not shown). At this time, a distance (a flange back amount) between the image sensor 421 and the body-side mount surface 321 of the fixed mount member 320 is adjustable by interposing washers (not shown) of arbitrary thicknesses between the front cover 410 and the image pickup module 420.

As mentioned above, since the first mount module 300 prevents infiltration of water and dust into the inside from the outside, infiltration of water and dust into the main body module 400 from the first mount module 300 is also prevented.

Figure 14A:
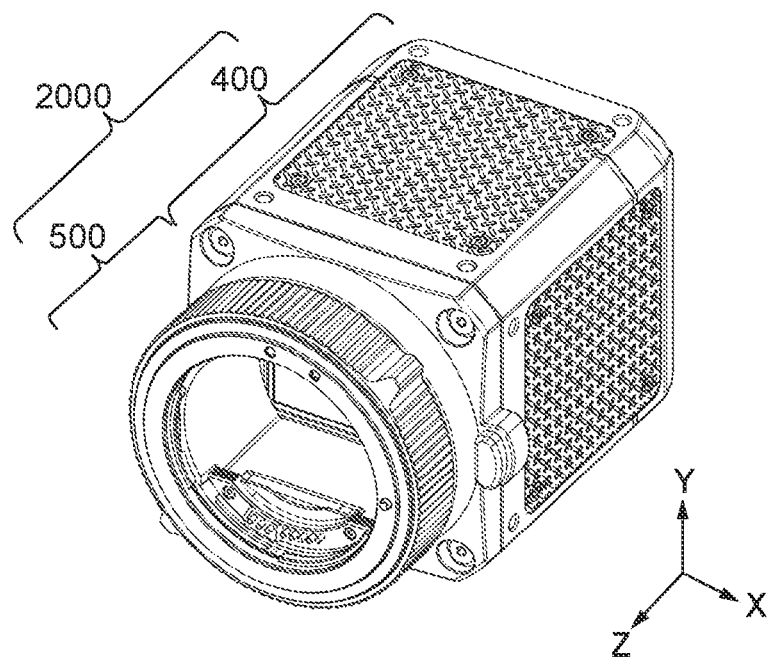
FIG. 14A and FIG. 14B are perspective views showing an image pickup apparatus and an image pickup system according to a second embodiment.
Figure 14B:
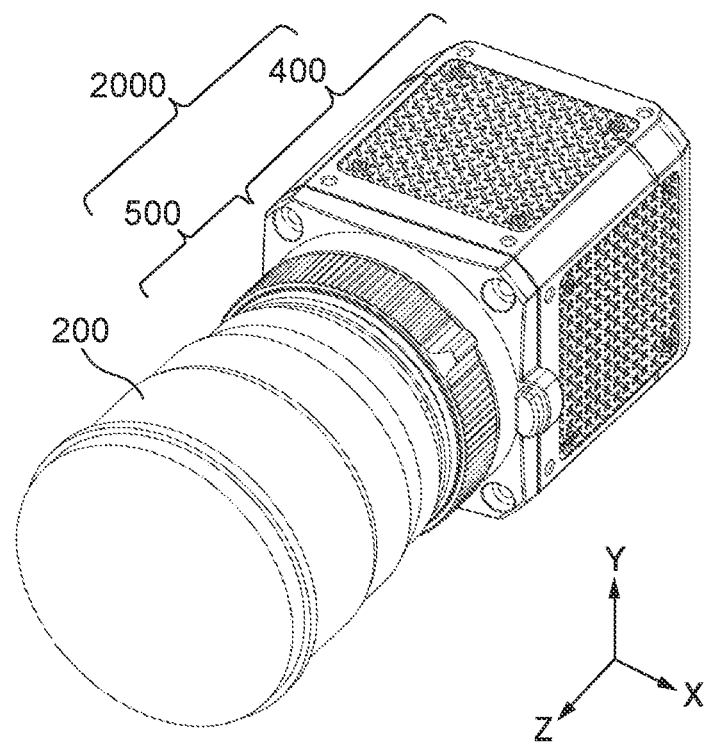

Next, a second embodiment will be described. FIG. 14A is a front-side perspective view showing an image pickup apparatus 2000 according to the second embodiment. FIG. 14B is a front-side perspective view showing the image pickup system in which a lens barrel 200 is attached to the image pickup apparatus 2000. The image pickup apparatus 2000 generally consists of a second mount module 500 and the main body module 400. Since the main body module 400 and the lens barrel 200 are equivalent to the configurations described in the first embodiment, their descriptions are omitted.

Figure 15:
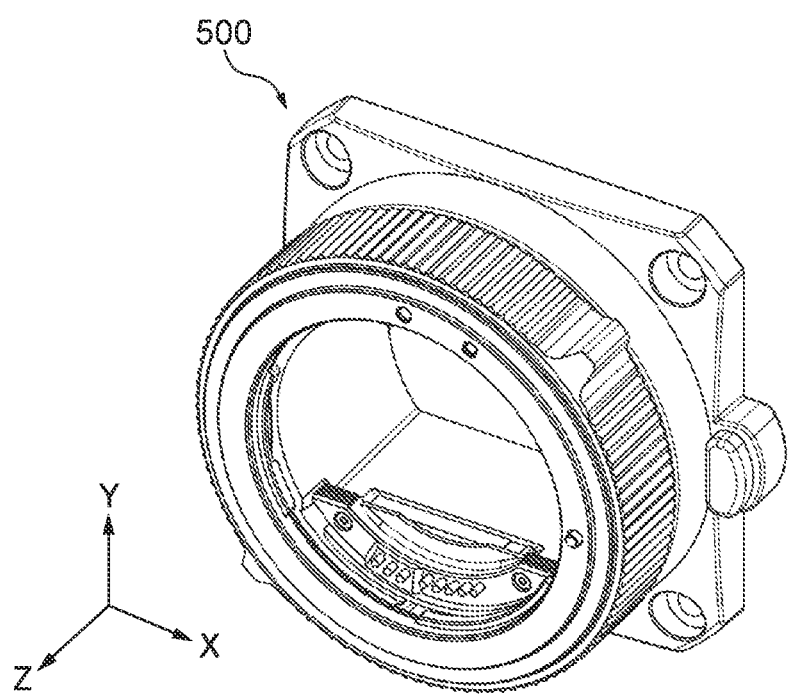
FIG. 15 is a front-side perspective view showing a second mount module.
Figure 16A:
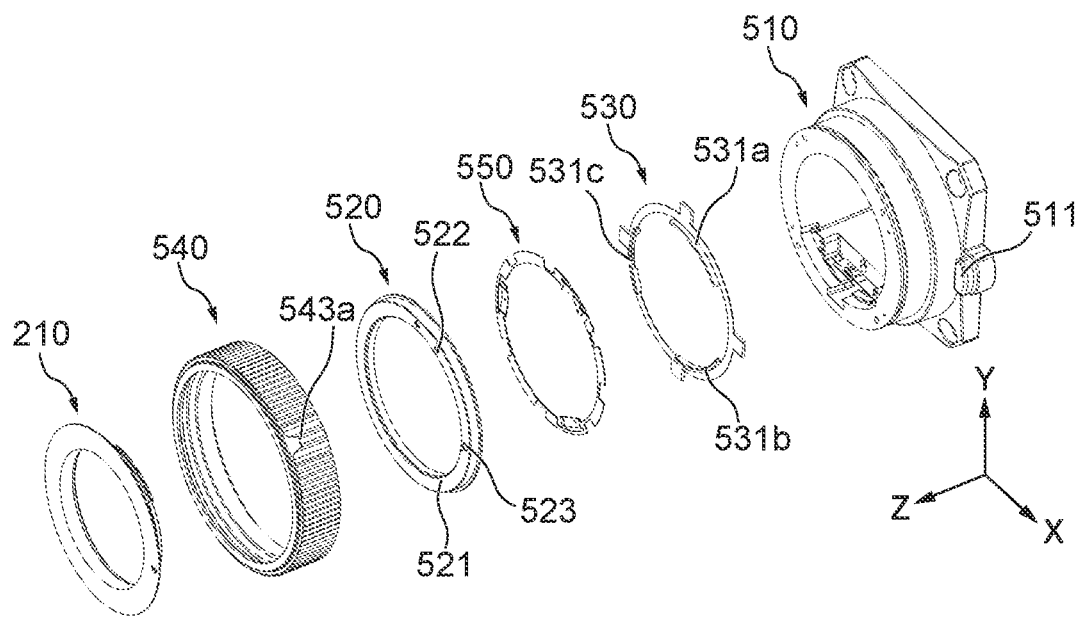
FIG. 16A and FIG. 16B are exploded perspective views describing a principal part of the second mount module.
Figure 16B:
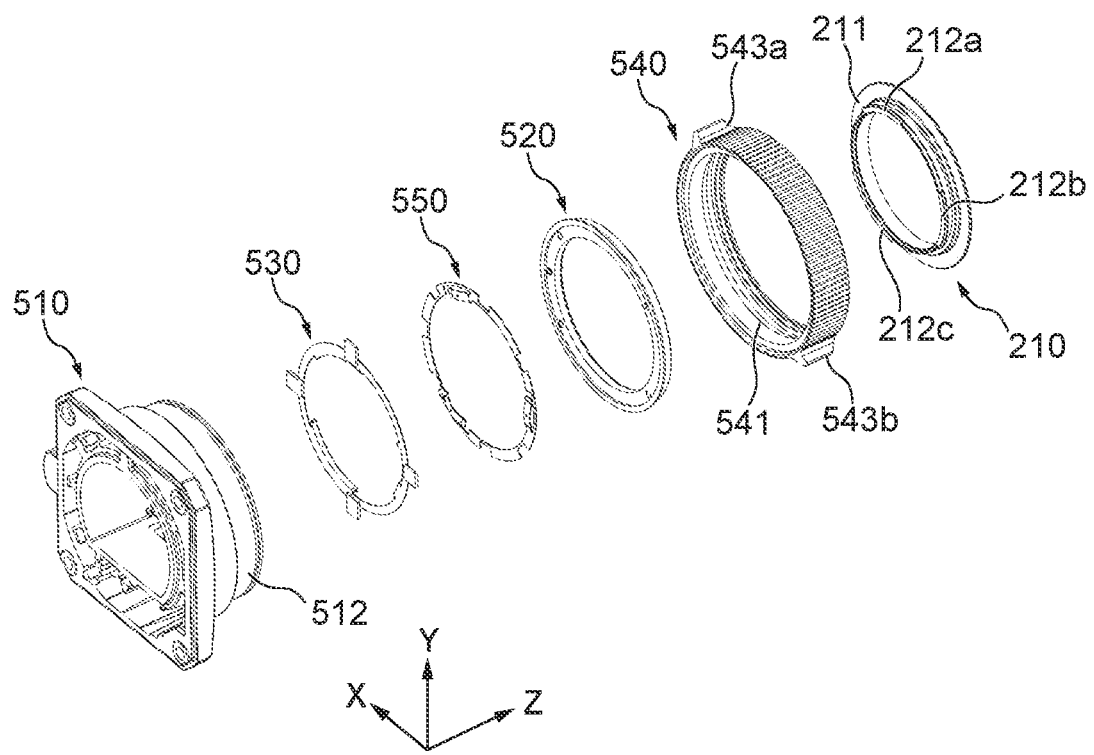
Figure 17:
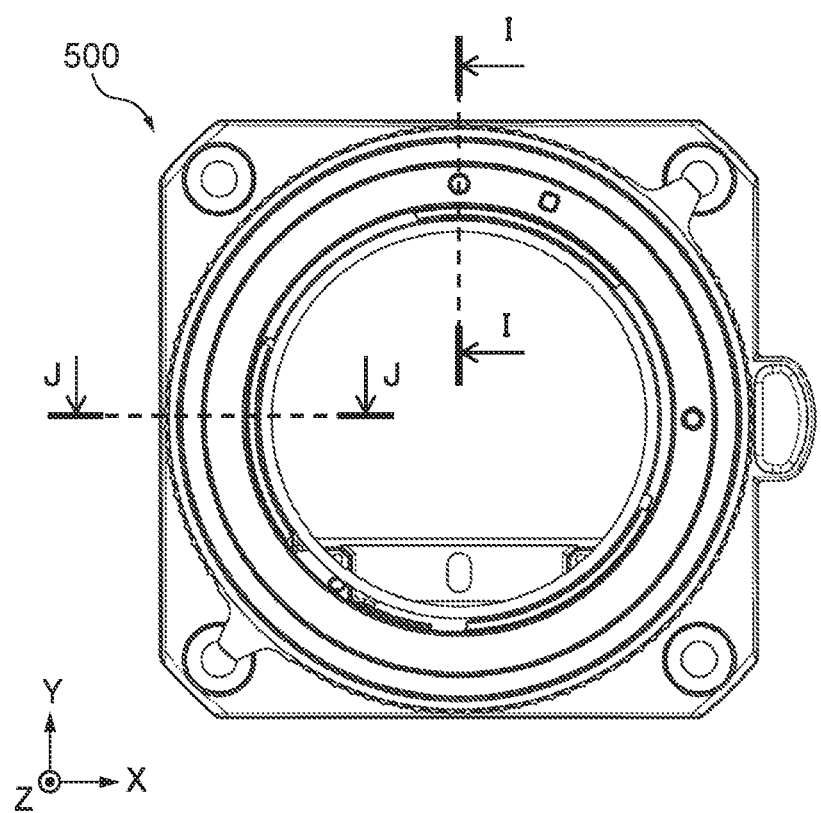
FIG. 17 is a front view showing the second mount module.
Figure 18A:
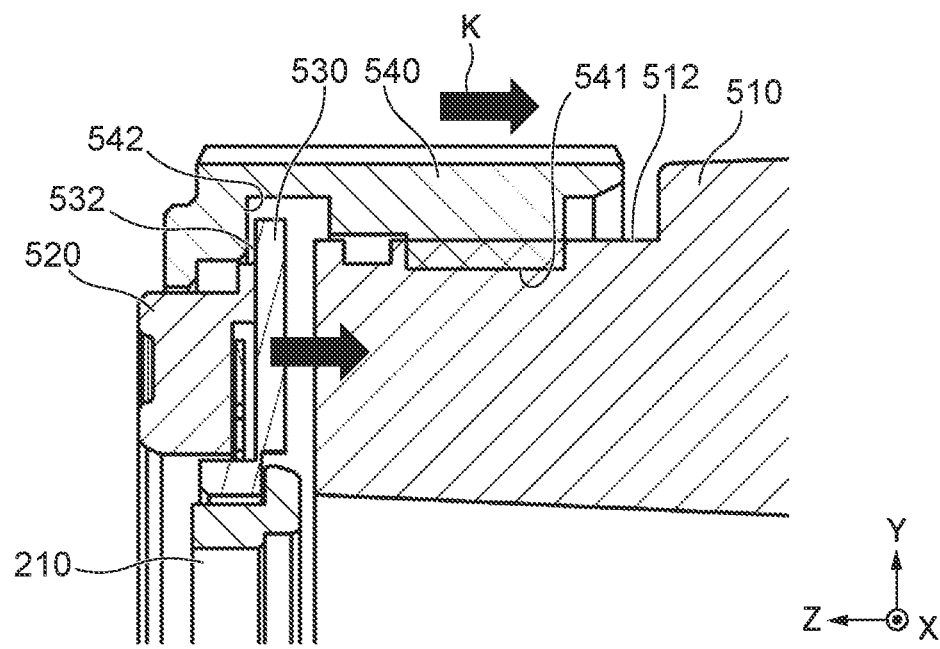
FIG. 18A and FIG. 18B are sectional views taken along lines I-I and J-J in FIG. 17.
Figure 18B:
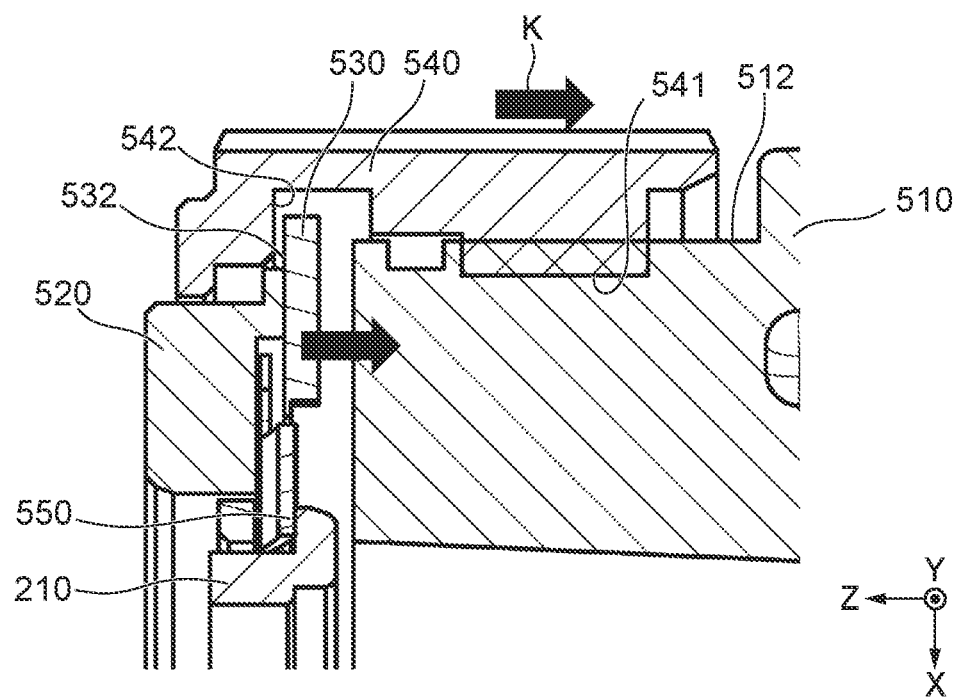

FIG. 15 is a front-side perspective view showing the second mount module 500. FIG. 16A and FIG. 16B are a front-side exploded perspective view and a back-side exploded perspective view for describing principal parts of the second mount module 500. FIG. 17 is a front view showing the second mount module 500. FIG. 18A and FIG. 18B are sectional views taken along lines I-I and J-J in FIG. 17. A component among the components of the second mount module 500 that is identical to a component of the first mount module 300 is denoted by the same name and the same numeral and its description is omitted.

The basic structure of the second mount module 500 is proportionate to the mount structure of the conventional bayonet connection system. The second mount module 500 is provided with a mount base 510, a fixed mount member 520, a claw unit 530, an operation ring 540, and a plate spring 550 as the principal parts.

When the lens-side mount surface 211 of the lens barrel 200 is abutted to a body-side mount surface 521 of the fixed mount member 520, a positioning pin 523 provided in the fixed mount member 520 moves toward the side of the main body module 400 (−Z-direction). A user rotates the lens barrel 200 clockwise when viewed from the +Z side to the −Z side in the state where an index (not shown) provided in the lens barrel 200 is aligned with an index 522 provided in the fixed mount member 520. Then, the positioning pin 523 of the fixed mount member 520 is fit into a hole (not shown) provided in the lens barrel 200, and the lens barrel 200 is fixed to the second mount module 500.

In the meantime, when the user presses a detachment button 511 provided in the mount base 510, the positioning pin 523 provided in the fixed mount member 520 moves in the −Z-direction and retracts from the hole (not shown) provided in the lens barrel 200. Thereby, the lens barrel 200 comes in a rotatable state. Accordingly, when the user rotates the lens barrel 200 counterclockwise when viewed from the +Z side to the −Z side in this state, the lens barrel 200 becomes detachable from the second mount module 500.

In the state where the lens barrel 200 is fixed to the second mount module 500, the bayonet-claw contact surfaces 213a through 213c of the bayonet claws 212a through 212c of the lens barrel 200 touch the claws 531a through 531c of the claw unit 530. Moreover, when the lens barrel 200 is fixed to the second mount module 500, the flat spring 550 energizes the bayonet claws 212a through 212c of the lens barrel 200 in the −Z-direction (see FIG. 18B).

It should be noted that the claw unit 530 can be considered as a part corresponding to the movable mount member 330 that constitutes the first mount module 300 in the first embodiment. Although the movable mount member 330 is arranged rotatable, the claw unit 530 is movable only in the optical axis direction by a predetermined distance and is not rotatable.

The fixed mount member 520 is fixed to the mount base 510 with screws (not shown). A third thread 541 is formed in the inner periphery of the operation ring 540 as an external thread around the optical axis. A fourth thread 512 is formed on the mount base 510 as an internal thread around the optical axis. The third thread 541 of the operation ring 540 is screwed to the fourth thread 512 of the mount base 510. Accordingly, when the operation ring 540 is rotated, the screwed position of the third thread 541 with respect to the fourth thread 512 varies, which moves the operation ring 540 in the optical axis direction.

As shown by an arrow K in FIG. 18A and FIG. 18B, when the operation ring 540 is rotated so as to move in the −Z-direction relative to the mount base 510, a first contact surface 542 of the operation ring 540 abuts to a second contact surface 532 of the claw unit 530. When the operation ring 540 is moved in the −Z-direction from this state, the operation ring 540 pushes the claw unit 530 in the −Z-direction, and the mount member 210 of the lens barrel 200 is also pushed in the −Z-direction due to this.

In this way, the lens barrel 200 is fixed to the second mount module 500 by the lens fixing method using the mount of the conventional bayonet connection system. After that, when the user grasps the knobs 543a and 534b of the operation ring 540 and rotates the operation ring 540 as mentioned above, the lens barrel 200 is more firmly fixed.

Figure 19A:
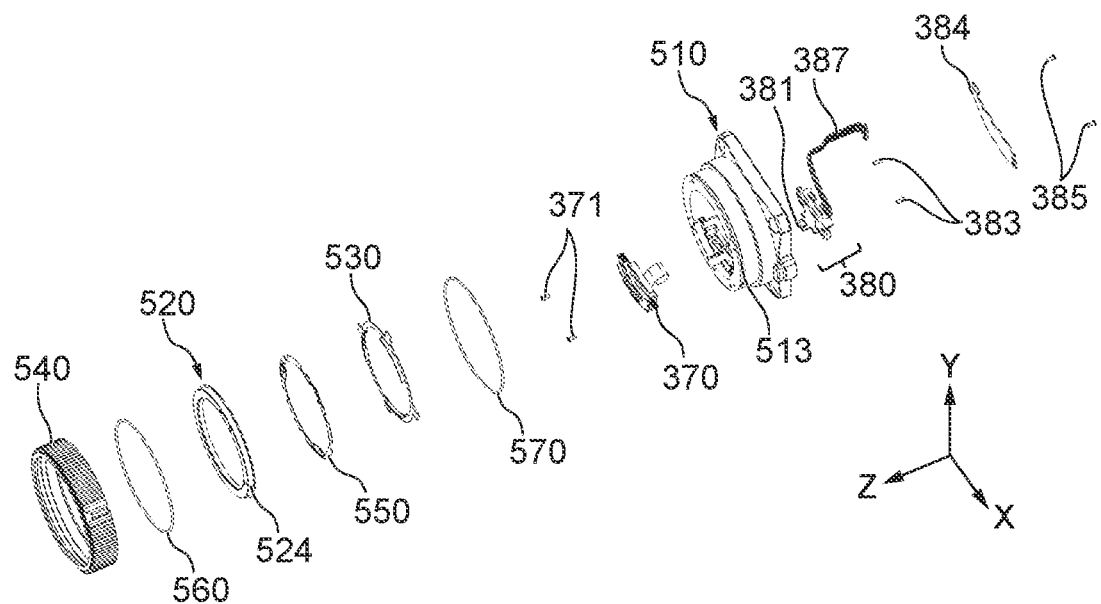
FIG. 19A and FIG. 19B are exploded perspective views showing the second mount module.
Figure 19B:
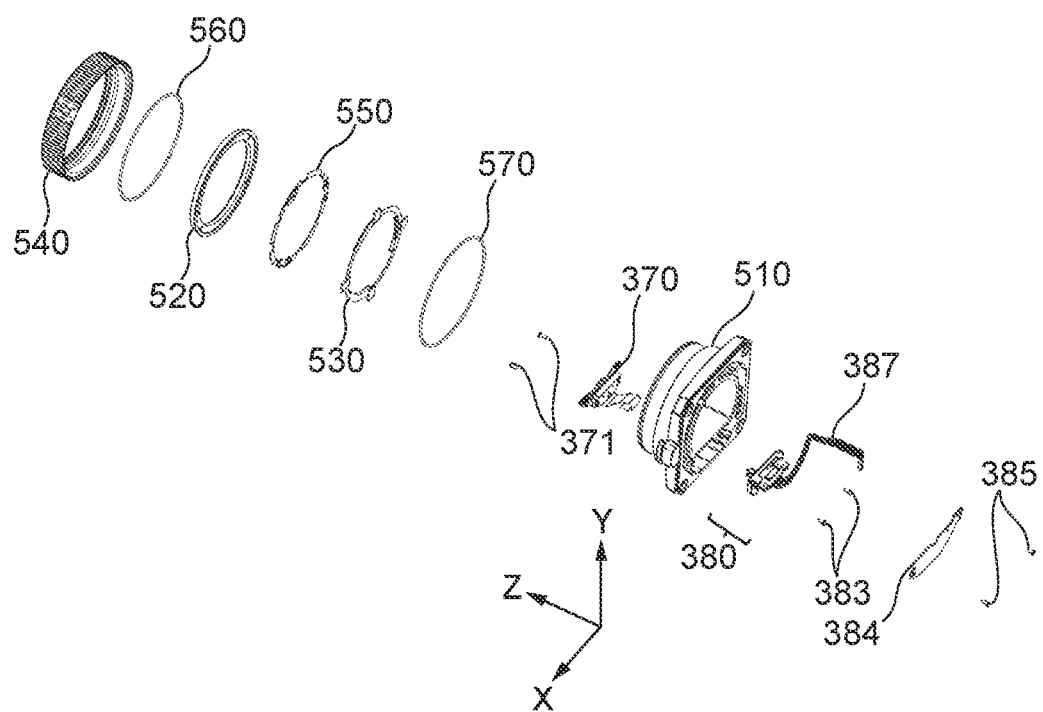
Figure 20A:
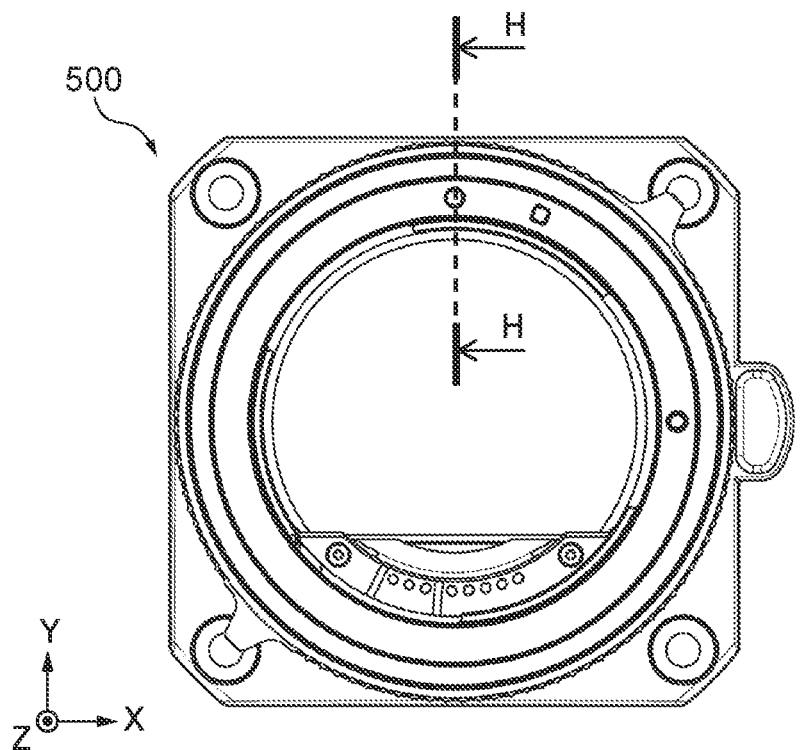
FIG. 20A is a front view showing the second mount module and FIG. 20B is a sectional view taken along a line H-H shown in FIG. 20A.
Figure 20B:
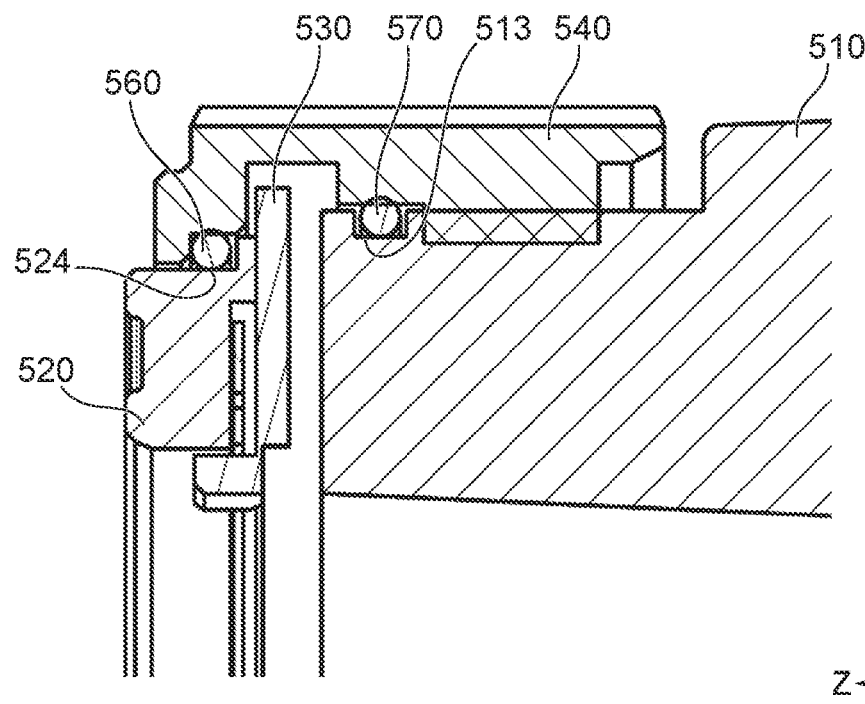

Next, a waterproof structure of the second mount module 500 will be described. FIG. 19A and FIG. 19B are a front-side exploded perspective view and a back-side exploded perspective view showing the second mount module 500. FIG. 20A is a front view showing the second mount module 500. FIG. 20B is a sectional view taken along a line H-H shown in FIG. 20A.

The second mount module 500 is provided with the mount base 510, fixed mount member 520, claw unit 530, operation ring 540, and plate spring 550 as mentioned above. The second mount module 300 is further provided with a first O-ring 560, a second O-ring 570, the electrical communication contact unit 370, the rotation detection unit 380, the cover 384, and the fixing screws 385.

The fixed mount member 520 has a step 524. The first O-ring 560 as an elastic member is arranged on the step 524. That is, the first O-ring 560 is arranged in a space formed between the fixed mount member 520 and the operation ring 540. Moreover, the mount base 510 has a groove 513. The second O-ring 570 as the elastic member is arranged in the groove 513. That is, the second O-ring 570 is arranged in a space formed between the mount base 510 and the operation ring 540.

As shown in FIG. 20B, since the space formed between the fixed mount member 520 and the operation ring 540 in the second mount module 500 is filled up with the first O-ring 560, a gap does not arise between the fixed mount member 520 and the operation ring 540. Moreover, since the space formed between the mount base 510 and the operation ring 540 is filled up with the second O-ring 570, a gap does not arise between the mount base 510 and the operation ring 540. Accordingly, infiltration of water and dust into the inside through the boundary between the fixed mount member 520 and the operation ring 540 and the boundary between the mount base 510 and the operation rings 540 is prevented.

Although the present invention has been described in detail on the basis of the suitable embodiment, the scope of the present invention is not limited to the specific embodiment. The present invention includes various configurations that do not deviate from the gist of the present invention. Furthermore, the embodiments mentioned above show examples of the present invention, and it is possible to combine the embodiments suitably. Although the O-ring is used as the sealing member in the above-mentioned embodiments, the sealing member is not limited to the O-ring. For example, a rubber sheet can be also used by shaping it into an annular form.

Figure 21:
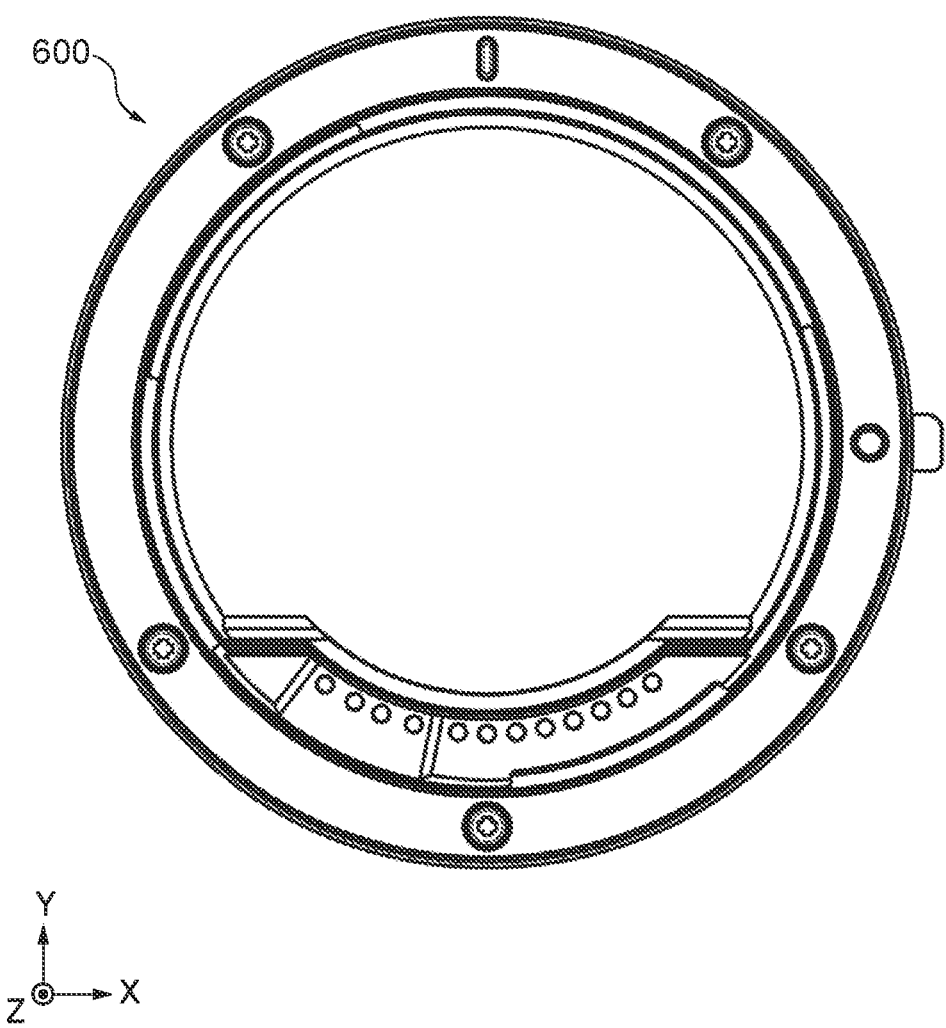
FIG. 21 is a front view showing a third mount module.

Moreover, the mount modules that employ the arbitrary mount shapes have been described in the above-mentioned embodiments. For example, a mount shape like a mount module 600 shown in FIG. 21 may be employed as shapes of claws in the fixed mount member of the mount module. That is, the mount modules according to the embodiments of the present invention can employ various shapes (types) of mount modules of which shapes of claws are different, for example.

Moreover, although the operation rings (340, 540) are exemplified as an operation member for rotating the movable mount member around the optical axis in the above-mentioned embodiments, the operation member is not restricted to the ring-shaped member. For example, the operation member may employ any configuration as long as the operation member can move the movable mount member. A shape that corresponds to the waterproof performance that is secured by the mount module can be selected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-174794, filed Oct. 16, 2020, which is hereby incorporated by reference herein in its entirety.

What is claimed is:

1. A mount module to which a lens barrel having claws is attachable, the mount module comprising:
   a base member;
   a fixed mount member having a first mount surface that abuts to a second mount surface of the lens barrel;
   a movable member that is arranged between the fixed mount member and the base member rotatably around an optical axis;
   movable claws that engage with the claws of the lens barrel and move in an optical axis direction by interlocking with rotation of the movable member;
   a first sealing member that is arranged between the movable member and the fixed mount member; and
   a second sealing member that is arranged between the movable member and the base member.

2. The mount module according to claim 1, further comprising a movable mount member that is screwed to the fixed mount member and is movable in the optical axis direction while rotating around the optical axis, and
   wherein the movable claws are provided in the movable mount member.

3. The mount module according to claim 2, wherein the fixed mount member is fastened to the base member,
   wherein the fixed mount member has a first thread,
   wherein the movable mount member has a second thread that is screwed with the first thread, and
   wherein the movable mount member moves in the optical axis direction because the second thread rotates with respect to the first thread due to rotation of the movable mount member.

4. The mount module according to claim 2, wherein in a case where the movable member is moved in the optical axis direction toward the base member, the movable mount member is pushed by the movable member and moves in the same direction.

5. The mount module according to claim 1, further comprising fixing screws that fasten the fixed mount member and the base member, and
   wherein the fixing screws fasten the fixed mount member and the base portion from a side opposite to an attachment side of the lens barrel.

6. The mount module according to claim 1, wherein the first sealing member and the second sealing member are shaped in an approximately annular form.

7. The mount module according to claim 1, wherein the first sealing member and the second sealing member are formed by elastic members.

8. An image pickup apparatus comprising:
   amount module to which a lens barrel having claws is attachable comprising:
      a base member;
      a fixed mount member having a first mount surface that abuts to a second mount surface of the lens barrel;
      a movable member that is arranged between the fixed mount member and the base member rotatably around an optical axis;
      movable claws that engage with the claws of the lens barrel and move in an optical axis direction by interlocking with rotation of the movable member;
      a first sealing member that is arranged between the movable member and the fixed mount member; and
      a second sealing member that is arranged between the movable member and the base member; and
   an image pickup apparatus body to which the mount module is attached and in which an image sensor that converts an optical image formed by incident light through the mount module into an electrical signal is included.

* * * * *